(12) United States Patent
Kunisawa et al.

(10) Patent No.: US 8,869,856 B2
(45) Date of Patent: *Oct. 28, 2014

(54) PNEUMATIC TIRE

(75) Inventors: Tetsuya Kunisawa, Kobe (JP); Keiichi Nakadera, Kobe (JP); Toru Iizuka, Kobe (JP); Takao Wada, Kobe (JP); Shinichi Miyazaki, Kobe (JP); Toshiro Matsuo, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 600 days.

This patent is subject to a terminal disclaimer.

(21) Appl. No.: 12/155,295

(22) Filed: Jun. 2, 2008

(65) Prior Publication Data

US 2008/0308203 A1 Dec. 18, 2008

(30) Foreign Application Priority Data

Jun. 15, 2007 (JP) ................................. 2007-159029
Jun. 29, 2007 (JP) ................................. 2007-172695
Jul. 19, 2007 (JP) ................................. 2007-188542
Jul. 19, 2007 (JP) ................................. 2007-188547

(51) Int. Cl.
*B60C 9/18* (2006.01)
*B60C 15/00* (2006.01)
*B60C 19/08* (2006.01)

(52) U.S. Cl.
USPC ........... 152/526; 152/537; 152/539; 152/547; 152/555

(58) Field of Classification Search
None
See application file for complete search history.

(56) References Cited

U.S. PATENT DOCUMENTS

| | | | | |
|---|---|---|---|---|
| 2,339,546 A | * | 1/1944 | Hanson | 152/152.1 |
| 4,351,745 A | * | 9/1982 | Stinger | 252/511 |
| 5,098,610 A | * | 3/1992 | Okamura et al. | 252/511 |
| 5,872,171 A | | 2/1999 | Detrano | |
| 6,138,733 A | * | 10/2000 | Nakamura | 152/543 |
| 6,156,143 A | | 12/2000 | Maly et al. | |

(Continued)

FOREIGN PATENT DOCUMENTS

| | | |
|---|---|---|
| EP | 1 533 144 A1 | 5/2005 |
| EP | 1 738 935 A2 | 1/2007 |

(Continued)

OTHER PUBLICATIONS

Office Action for Japanese Application No. 2007-172695, dated Jan. 24, 2012.

(Continued)

*Primary Examiner* — Justin Fischer
(74) *Attorney, Agent, or Firm* — Birch, Stewart, Kolasch & Birch, LLP

(57) ABSTRACT

A pneumatic tire capable of reducing rolling resistance and discharging static electricity generated during running, wherein each of a tread rubber, a breaker rubber, and a sidewall rubber formed on the tread part, the breaker part, and the sidewall part, respectively, has a volume specific resistivity of $1 \times 10^8$ Ω·cm or more, the pneumatic tire further including a conduction rubber embedded in the tread part so as to be at least partially exposed to a surface of the tread part, bead part rubber disposed at a region contacting a rim flange of the bead part, and electroconductive rubber electrically connecting the conduction rubber to the beat part rubber, wherein each of the conduction rubber, the bead part rubber, and the electroconductive rubber has a volume specific resistivity of less than $10^8$ Ω·cm.

4 Claims, 4 Drawing Sheets

(56) References Cited

U.S. PATENT DOCUMENTS

| | | | |
|---|---|---|---|
| 6,516,847 B1 * | 2/2003 | Amaddeo et al. | 152/209.5 |
| 8,336,589 B2 * | 12/2012 | Wada | 152/152.1 |
| 2005/0103412 A1 | 5/2005 | Zanzig et al. | |
| 2006/0042733 A1 | 3/2006 | Matsui | |
| 2006/0096697 A1 | 5/2006 | Miki | |
| 2006/0102264 A1 | 5/2006 | Nicolas | |
| 2007/0000585 A1 | 1/2007 | Uchida et al. | |
| 2007/0125466 A1 | 6/2007 | Nagahara | |
| 2007/0163690 A1 | 7/2007 | Nobuchika et al. | |

FOREIGN PATENT DOCUMENTS

| | | | |
|---|---|---|---|
| EP | 1 803 589 A1 | | 7/2007 |
| JP | 52-2902 | * | 1/1977 |
| JP | 57-147903 A | | 9/1982 |
| JP | 62-283001 A | | 12/1987 |
| JP | 8-34204 A | | 2/1996 |
| JP | 8-230407 A | | 9/1996 |
| JP | 08-293392 A | | 11/1996 |
| JP | 10-36559 A | | 2/1998 |
| JP | 10-81110 A | | 3/1998 |
| JP | 10-175403 A | | 6/1998 |
| JP | 10-204213 A | | 8/1998 |
| JP | 10-298356 A | | 11/1998 |
| JP | 2000-85316 A | | 3/2000 |
| JP | 2000-118212 A | | 4/2000 |
| JP | 2000-190709 A | | 7/2000 |
| JP | 2004268863 | * | 9/2004 |
| JP | 2006-69341 A | | 3/2006 |
| JP | 2006-137067 A | | 6/2006 |
| JP | 2006-143208 A | | 6/2006 |
| JP | 2007-8269 A | | 1/2007 |
| JP | 2007-51170 A | | 3/2007 |
| JP | 2007-153092 A | | 6/2007 |
| JP | 2007-176437 A | | 7/2007 |
| JP | 2008-293392 A | | 12/2008 |
| RU | 2221705 C2 | | 9/2002 |
| RU | 2225299 C2 | | 9/2002 |

OTHER PUBLICATIONS

Office Action for Japanese Application No. 2007-188542, dated Feb. 14, 2012.
Japanese Office Action dated Sep. 4, 2012 in Application No. 2007-159029 with English translation.
Decision to Grant Patent Issued by the Japanese Patent Office on Sep. 25, 2012.
Japanese Office Action dated Jul. 30, 2013 for Application No. 2012-237728.
Japanese Office Action dated Dec. 20, 2011, for Application No. 2007-159029.
Korean Office Action dated Jun. 14, 2010 for corresponding Korean Application No. 10-2008-0055789.

* cited by examiner

PNEUMATIC TIRE

This nonprovisional application is based on Japanese Patent Application No. 2007-159029 filed on Jun. 15, 2007, No. 2007-172695 filed on Jun. 29, 2007, Nos. 2007-188542 and 2007-188547 filed on Jul. 19, 2007, with the Japan Patent Office, the entire contents of which are hereby incorporated by reference.

BACKGROUND OF THE INVENTION

1. Field of the Invention

The present invention relates to a pneumatic tire improved in safety by keeping low rolling resistance and reducing static electricity generated during tire running.

2. Description of the Background Art

In recent years, various methods for using silica for a tread part, a breaker, a sidewall part, or the like of a tire have been proposed for the purpose of reduction in tire rolling resistance as well as of maintenance of wet grip performance. However, a problem of lack in safety is raised in the case where silica is contained in a large amount since electrical resistance of the tire is increased to generate spark due to static electricity, for example, during supply of fuel for a vehicle, so that the fuel catches fire. Therefore, there is a demand for a tire that realizes of a reduction in rolling resistance and maintenance of wet grip performance and is capable of preventing static electricity from being generated.

Japanese Patent Laying-Open No. 08-230407 discloses, as a pneumatic tire capable of improving electroconductivity and preventing discharge phenomenon caused by accumulation of static electricity in a vehicle body, a tire wherein: a rubber composition forming a tread part contains carbon black in a blending amount of 50 parts by weight or less with respect to 100 parts by weight of a rubber component and a non-carbon black reinforcing agent; a rubber component forming a sidewall part contains carbon black in a blending amount of 40 parts by weight or less with respect to 100 parts by weight of a rubber component; and an electroconductive thin film is disposed on the tread part and the sidewall part. It is disclosed in the publication that a rubber component forming the electroconductive thin film contains carbon black in a blending amount of 60 parts by weight or more with respect to 100 parts by weight of a rubber component and in a ratio of 35 wt % of the whole rubber composition.

Japanese Patent Laying-Open No. 2000-190709 proposes a pneumatic tire capable of maintaining excellent wet grip performance and effectively reducing tire electrical resistance as well as of stably exhibiting such characteristics from an initial use to a wear limit of the tire. The publication proposes a pneumatic tire, wherein a tread rubber includes a main tread rubber part that is made from an insulating rubber material having a volume specific resistivity of $1 \times 10^8$ Ω·cm or more and an outer electroconductive part that is made from a shoulder part electroconductive rubber material having a volume specific resistivity of less than $1 \times 10^8$ Ω·cm, forms a contact area together with a main tread part, and ends with a gap of 3% to 35% of a contact area margin in a tire axially inner direction from an edge of the contact area, the outer electroconductive part is in the form of a sheet having a thickness of 0.01 to 1.0 mm, exposed to a treat outer surface including a groove wall and a groove bottom of a lateral groove to be continuous in a tire circumferential direction; a wing rubber, a sidewall rubber, and a clinch rubber are formed of the shoulder part electroconductive rubber material; and the outer electroconductive part is continued to the wing rubber.

Japanese Patent Laying-Open No. 10-036559 proposes, as a tire sidewall rubber composition capable of rendering a tire having small rolling resistance, wear resistance, excellent wet performance, and small electrical resistance, a tire sidewall rubber composition obtainable by mixing and kneading 100 parts by weight of a specific diene-based rubber, 5 to 50 parts by weight of carbon black having a DBP oil absorption amount of 120 ml/100 g or less and a CTAB surface area of 130 μm²/g or less, 10 to 60 parts by weight of precipitated silica having a DBP oil absorption amount of 200 ml/100 g or more and a BET nitrogen adsorption specific surface area of 180 m²/g or less, and a silane coupling agent in an amount capable of controlling a reactive factor within a specific range.

Japanese Patent Laying-Open No. 08-034204 proposes a tire tread including a strip that is made from a tire tread rubber composition having a high resistivity by using silica as a reinforcing agent and has a predetermined side width while extending in a length direction and an electroconductive strip that spreads in the length direction in the side width and made from a tire rubber composition having a volume resistivity of $10^8$ Ω·cm or less and a low resistivity.

However, in view of the methods in Japanese Patent Laying-Open Nos. 08-230407, 2000-190709, 10-036559, and 08-034204, there is a demand for improvement in satisfactory and excellent valance between low rolling resistance and high safety.

SUMMARY OF THE INVENTION

The present invention keeps low rolling resistance and effectively prevents accumulation of static electricity generated in a tire contact area or a region where a tire contacts a rim during tire running.

The present invention provides a pneumatic tire including a tread part, a sidewall part, a bead part, a carcass extending from the tread part to the bead part through the sidewall part, and a breaker part disposed at an outside of the carcass in a tire radial direction, wherein each of a tread rubber, a breaker rubber, and a sidewall rubber formed on the tread part, the breaker part, and the sidewall part, respectively, has a volume specific resistivity of $1 \times 10^8$ Ω·cm or more, the pneumatic tire further including a conduction rubber embedded in the tread part so as to be at least partially exposed to a surface of the tread part, a bead part rubber disposed at a region contacting a rim flange of the bead part, and an electroconductive rubber electrically connecting the conduction rubber to the beat part rubber, wherein each of the conduction rubber, the bead part rubber, and the electroconductive rubber has a volume specific resistivity of less than $1 \times 10^8$ Ω·cm.

The bead part rubber is a clinch rubber or a chafer rubber. The conduction rubber is preferably formed continuously in a tire circumferential direction. Further, the conduction rubber preferably has a thickness in the range of from 0.2 to 2 mm.

According to another aspect of the present invention, there is provided a pneumatic tire including a tread part, a sidewall part, a bead part, a carcass extending from the tread part to the bead part through the sidewall part, and a breaker part disposed at an outside of the carcass in a tire radial direction, wherein each of a tread rubber, a breaker rubber, and a sidewall rubber formed on the tread part, the breaker part, and the sidewall part, respectively, has a volume specific resistivity of $1 \times 10^8$ Ω·cm or more, the pneumatic tire further including a shoulder part electroconductive rubber disposed at a lower region of both edges of the breaker, a coating rubber coating an upper part of the breaker and having a region of at least 5 mm for contact with the shoulder part electroconductive rubber, a conduction rubber contacting the coating rubber and embedded in the tread part so as to be at least partially exposed to a surface of a tread, and a bead part rubber contacting a lower end of the carcass and disposed at a region contacting a rim flange of the bead part, wherein each of a ply rubber forming the carcass, the shoulder part electroconductive rubber, the coating rubber, the conduction rubber, and the bead part rubber has a volume specific resistivity of less than $1\times10^8$ Ω·cm.

At least one of the ply rubber forming the carcass, the shoulder part electroconductive rubber, the coating rubber, the conduction rubber, and the bead part rubber preferably contains metal foil or electroconductive carbon black.

The ply rubber, the shoulder part electroconductive rubber, the coating rubber, the conduction rubber, and the bead part rubber contains carbon black having a nitrogen adsorption specific surface area of 100 m$^2$/g or more in an amount of 30 to 100 parts by mass with respect to 100 parts by mass of a rubber component.

Further, the ply rubber, the shoulder part electroconductive rubber, the coating rubber, the conduction rubber, and the bead part rubber preferably contains metal foil in an amount of 1 to 10 parts by mass with respect to 100 parts by mass of the rubber component.

According to yet another aspect of the present invention, there is provided a pneumatic tire including a tread part, a sidewall part, a bead part, a carcass extending from the tread part to the bead part through the sidewall part, and a breaker part disposed at an outside of the carcass in a tire radial direction, wherein each of a tread rubber, a breaker rubber, and a sidewall rubber formed on the tread part, the breaker part, and the sidewall part, respectively, has a volume specific resistivity of $1\times10^8$ Ω·cm or more, the pneumatic tire further including a side part electroconductive rubber extending from at least both edges of the breaker part to the bead along the outside of the carcass, a coating rubber having a region for contact with the side part electroconductive rubber and disposed so as to coat an upper part of the breaker, a conduction rubber contacting the coating rubber and embedded in the tread part so as to be partially exposed to a surface of a tread, and a bead part rubber contacting a lower end of the side part electroconductive rubber and disposed at a region contacting a rim flange of the bead part, wherein the side part electroconductive rubber, the coating rubber, and the conduction rubber contain carbon black having a nitrogen adsorption specific surface area of 600 m$^2$/g or more in an amount of 5 parts by mass or more with respect to 100 parts by mass of a rubber component and a silica having a nitrogen adsorption specific surface area of 70 m$^2$/g or more and 250 m$^2$/g or less with respect to 100 parts by mass of the rubber component, and each of the side part electroconductive rubber, the coating rubber, and the conduction rubber each have a volume specific resistivity of less than $1\times10^8$ Ω·cm.

A ketjen black is suitably used as the carbon black. The bead part rubber preferably has a volume specific resistivity of less than $1\times10^8$ Ω·cm. A thickness of the side part electroconductive rubber is preferably adjusted to a range of 0.2 to 2 mm.

According to yet another aspect of the present invention, there is provided a pneumatic tire including a tread part, a sidewall part, a bead part, and a carcass extending from the tread part to the bead part through the sidewall part, and a breaker part disposed at an outside in a tire radial direction, wherein each of a tread rubber, a breaker rubber, and a sidewall rubber formed on the tread part, the breaker part, and the sidewall part, respectively, has a volume specific resistivity of $1\times10^8$ Ω·cm or more, the pneumatic tire further including an entire area electroconductive rubber disposed between a carcass ply forming the carcass and the sidewall rubber and between the breaker part and the tread part and having a thickness of 0.2 to 3.0 mm, a conduction rubber contacting the entire area electroconductive rubber and embedded in the tread part so as to be partially exposed to a surface of the tread part, and a bead part rubber coupled to a lower end of the side part electroconductive rubber and disposed at a region contacting a rim flange of the bead part, wherein the entire area electroconductive rubber, the conduction rubber, and the bead part rubber each have a volume specific resistivity of less than $1\times10^8$ Ω·cm.

The entire area electroconductive rubber preferably contains wood tar carbon black in an amount of 20 to 100 parts by mass with respect to 100 parts by mass of a natural rubber component.

In the pneumatic tire of the present invention, it is possible to reduce rolling resistance of the tire and to effectively prevent accumulation of static electricity generated in a tire contact area or a region where the tire contacts the rim during tire running by using rubber blending having small rolling resistance for forming each of the tread part, the breaker, and the side wall part as well as by electrically connecting the bead part rubber to the conduction rubber embedded in the tread part so as to contact a road surface through the sidewall part and the coating rubber disposed on the upper part of the breaker with the shoulder part electroconductive rubber interposed therebetween. Thus, it is possible to obtain the pneumatic tire that maintains a low fuel consumption tire property and is improved in safety in use.

In the pneumatic tire according to another embodiment of the present invention, rubber blending having small rolling resistance is used for the tread part, the breaker part, and the sidewall part. On the other hand, the pneumatic tire has a structure in which the bead part rubber is connected to the coating rubber disposed on the upper part of the breaker part with the side part electroconductive rubber interposed therebetween, and is electrically connected to the conduction rubber embedded in the tread part so as to contact a road surface. By employing such a structure, it is possible to reduce tire rolling resistance and to effectively reduce accumulation of static electricity generated in a tire contact area or a region where the tire contacts the rim during tire rubbing. Therefore, it is possible to provide the pneumatic tire that maintains a low fuel consumption tire property and is improved in safety in use.

In the pneumatic tire of the present invention, it is possible to reduce rolling resistance of the tire and to effectively prevent accumulation of static electricity generated in a tire contact area or a region where the tire contacts the rim during tire running by using a material having high electrical resistance of rubber for forming each of the tread part, the breaker, and the sidewall part, connecting the entire area electroconductive rubber provided between the carcass ply and the sidewall rubber and between the breaker and the tread part to the conduction rubber that contact the electroconductive rubber with the road surface, and setting electrical resistance and a thickness of the entire area electroconductive rubber to predetermined ranges. Thus, it is possible to obtain the pneumatic tire that maintains a low fuel consumption tire property and is improved in safety in use.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<Basic Structure>

Figure 1:
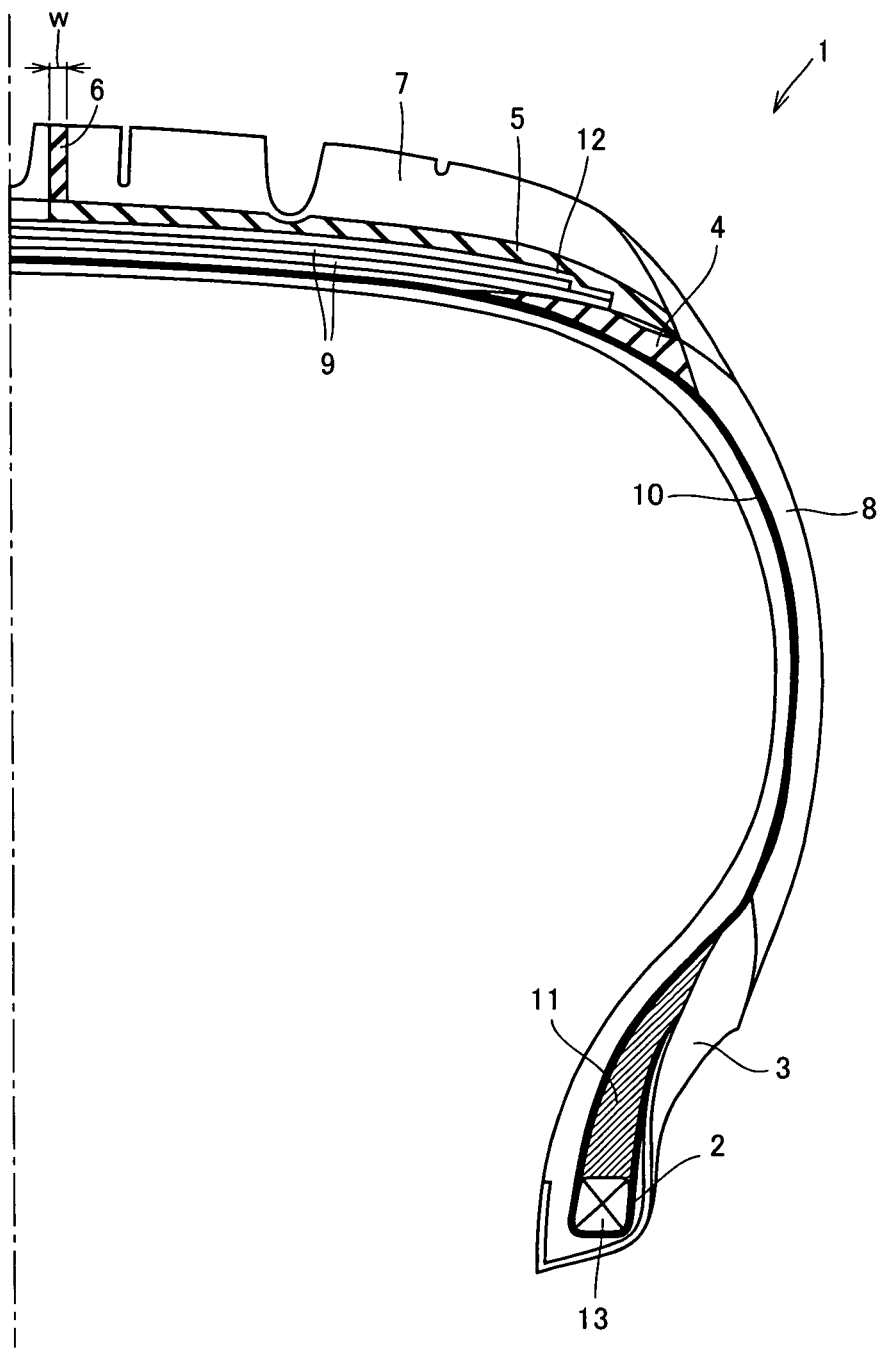
FIG. 1 shows a right half of a sectional view of a pneumatic tire according to Embodiment 1 of the present invention.

A basic structure of a pneumatic tire of the present invention will be described with reference to FIG. 1 showing an upper right half of a cross section of the tire.

A tire 1 is provided with a tread rubber 7 forming a tread part, a sidewall rubber 8 forming a pair of sidewall parts extending from both ends of tread rubber 7 in a tire radially inward direction, and a pair of bead parts located at an inner end of each of the sidewall parts. On the bead part, a clinch rubber 3 and a chafer 9 are disposed at a region contacting a rim flange. A carcass 10 is bridged over the pair of beat parts, and a breaker rubber 9 forming a breaker part is disposed at a tire radially outside of carcass 10. Carcass 10 is formed of at least one carcass ply for aligning a carcass cord, and the carcass ply is folded back from an inner part to an outside in a tire axial direction around a bead core 13 and a bead apex 11 extending from an upper end of bead core 13 to a sidewall direction through from the tread part to the sidewall part and locked by a locking part.

The pneumatic tire of the present invention has a structure in which a conduction rubber 6 is disposed on tread rubber 7 so as to be partially exposed to a contact area, and conduction rubber 6 is electrically connected to a bead part rubber of clinch rubber 3 and/or a chafer rubber 2 by an electroconductive rubber. With such a structure, it is possible to discharge static electricity to the outside of the tire even when static electricity is generated during tire running.

It is possible to form the electroconductive rubber from a plurality of electroconductive members besides a mode of continuous connection from the conduction rubber to the bead part rubber.

Embodiment 1

One example of a structure of the pneumatic tire of the present invention is as in FIG. 1 in which the upper right half of the cross section of the tire is shown. Tire 1 is provided with tread rubber 7 forming a tread part, sidewall rubber 8 forming a pair of sidewall parts extending from both ends of tread rubber 7 in a tire radially inward direction, clinch rubber 3 forming a clinch part located at an inner end of the sidewall parts, and chafer rubber 2 forming a chafer located at an upper part of a rim. Carcass 10 is bridged over the clinch part and between the chafers and breaker rubber 9 forming a breaker part is disposed at a tire radially outside of carcass 10. Carcass 10 is formed of at least one carcass ply for aligning a carcass cord, and the carcass ply is folded back from an inner part to an outside in a tire axial direction around bead core 13 to bead apex 11 extending from an upper end of bead core 13 to a sidewall direction through from the tread part and the sidewall part and locked by a locking part. The breaker part is formed of at least two breaker plies that are aligned breaker cords, and the breaker cords are overlapped with orientations thereof being alternated so that the breaker cords intersects with each other. In the pneumatic tire of the present invention, a coating rubber 5 is provided between the tread part and the breaker part. A shoulder part electroconductive rubber 4 having a region of at least 5 mm for contact with coating rubber 5 is disposed between the carcass ply and the both ends of the breaker part and the sidewall part. Conduction rubber 6 is disposed on tread rubber 7 so as to contact coating rubber 5 and be partially exposed to the contact area, and conduction rubber 6 has a structure in which coating rubber 5, shoulder part electroconductive rubber 4, carcass 10, and clinch rubber 3 serving as the bead part rubber and/or chafer rubber 2 are electrically connected.

By using the above-described structure, static electricity generated on the bead part rubber located in the region contacting with the rim or on the contact region during tire rubbing is discharged to the outside of the tire, through the electrically connected electroconductive rubber members inside the tire.

<Tread Rubber, Breaker Rubber, and Sidewall Rubber>

Each volume specific resistivity of the tread rubber, the breaker rubber, and the sidewall rubber forming the tire is set to $1\times10^8$ Ω·cm or more. Though carbon black has heretofore been used as a rubber reinforcing agent, it is possible to reduce rolling resistance by using silica in place of the carbon black. Further, since the silica is not an oil-derived material, silica is preferably used from the view point of environment problems as compared to the carbon that is the oil-derived material. However, in the case of using silica, the volume specific resistivity tends to be increased. In the present invention, a reduction in tire rolling resistance and the basic characteristics such as rubber processability are maintained by basically containing silica, and the problem of high electrical resistance of a volume specific resistivity of $1\times10^8$ Ω·cm or more of a rubber composition is improved.

In the pneumatic tire of the present invention, 50 mass % or more of the above-described filler contained in each of the tread rubber, the breaker rubber, and the sidewall rubber is preferably a silica. In the case where 50 mass % or more of the filler is the silica, an effect of reducing the tire rolling resistance is good. A ratio of the silica in the filler is preferably 70 mass % or more, more preferably 90 mass % or more. In the present invention, all of the filler may be the silica, but other fillers are used in combination for the purpose of adjusting electroconductivity and mechanical strength of each of the tread rubber, the breaker rubber, and the sidewall rubber.

The silica may be contained in an amount of 5 parts by mass or more and 100 parts by mass or less with respect to 100 parts by mass of a rubber component in each of the tread rubber, the breaker rubber, and the sidewall rubber. In the case where the silica blending amount is 5 parts by mass or more with respect to 100 parts by mass of the rubber component, it is to possible to reduce tire rolling resistance. In the case where the silica compounding amount is 100 parts by mass or less, it is possible to favorably prevent a reduction in processability due to viscosity increase of an unvulcanized rubber composition and excessive increase in cost.

As the silica, it is possible to use those generally used rubbers, and examples thereof include dry method white carbon, wet method white carbon, colloidal silica, and the like. Among others, the wet method white carbon mainly containing hydrous silicic acid is preferable.

The nitrogen adsorption specific surface area of silica (BET method) is preferably in the range of from 100 to 300 m²/g, more preferably 150 to 250 m²/g. In the case where the nitrogen adsorption specific surface area is 100 m²/g or more, a satisfactory reinforcing effect is achieved to favorably improve wear resistance of the tire. On the other hand, in the case where the nitrogen adsorption specific surface area is 300 m$^2$/g or less, processability of the rubbers during production is good, and good tire driving stability is ensured. The nitrogen adsorption specific surface area is measured by the BET method in accordance with ASTM D3037-81.

<Coating Rubber>

Coating rubber 5 in the present invention is provided disposed so as to contact shoulder part electroconductive rubber 4 and conduction rubber 6 and made from a rubber having a volume specific resistivity set to less than 1×10$^8$ Ω·cm. It is possible to achieve a desired degree of tire electroconductivity improvement effect when the volume specific resistivity is less than 1×10$^8$ Ω·cm. Also, the volume specific resistivity may be set in the same manner as in the shoulder part electroconductive rubber and is preferably 1×10$^7$ Ω·cm or less, more preferably 1×10$^6$ Ω·cm or less and is preferably 1×10$^3$ Ω·cm or more, more preferably 1×10$^4$ Ω·cm or more.

It is possible to achieve a desired degree of the tire electroconductivity improvement effect when a thickness of coating rubber 5 is 0.2 mm or more, and the tire rolling resistance is not deteriorated by a large degree when the thickness is 3.0 mm or less. The thickness of the shoulder part electroconductive rubber is preferably 0.5 to 2.0 mm, particularly preferably in the range of from 0.9 to 1.5 mm. It is sufficient that coating rubber 5 has the part contacting with the shoulder part electroconductive rubber and the conduction rubber, and it is also possible to provide coating rubber 5 allover the portion between the tread part and the breaker part or to partially provide to a position at which the conduction rubber is disposed or to a range exceeding the position.

The part of the coating rubber contacting the shoulder part electroconductive rubber and the conduction rubber is preferably a part for contact with the shoulder part electroconductive rubber in the form of a strip extending in a tire circumferential direction and having a width of 5 mm or more, more preferably 10 mm or more. By contacting the shoulder part electroconductive rubber and the coating rubber under the above-described conditions, it is possible to achieve a satisfactory tire electroconductive effect. The contact with the conduction rubber is preferably the contact with the whole part of the conduction rubber in a tire width direction.

In the present invention, the coating rubber may preferably contain carbon black that is contained in the range of from 30 to 100 parts by mass with respect to 100 arts by mass of a rubber component. In the case where 30 parts by mass or more of carbon black is contained with respect to 100 parts by mass of the rubber component, electroconductivity of the coating rubber is increased. In the case where the blending amount of carbon black is 100 parts by mass or less with respect to 100 parts by mass of the rubber component, durability is improved. The blending amount of carbon black with respect to 100 parts by mass of the rubber component is preferably 35 parts by mass or more, more preferably 40 parts or more by mass and is preferably 80 parts by mass or less, more preferably 70 parts by mass or less.

The nitrogen adsorption specific surface area of carbon black contained in the coating rubber is preferably 100 m$^2$/g or more and 1,500 m$^2$/g or less. Mechanical strength of the coating rubber is good when the nitrogen adsorption specific surface area is 100 m$^2$/g or more. The nitrogen adsorption specific surface area of 1,500 m$^2$/g or less is preferred from the view point of ensuring processability during production. The nitrogen adsorption specific surface area may more preferably be 105 m$^2$/g or more and is preferably 1,300 m$^2$/g or less, more preferably 1,000 m$^2$/g or less. As carbon black, wood tar carbon black that is not an oil-derived stock is suitably used.

Silica or the like, for example, may be contained as a filler in the coating rubber in addition to carbon black, but, from the view point of imparting good electroconductivity, carbon black may preferably occupy 8 mass %, more preferably 15 mass % or more, further preferably 100 mass % or more of the fillers.

In the case where the coating rubber contains silica, the blending amount of silica is 10 parts by mass or more and 55 parts by mass or less, for example, with respect to 100 parts by mass of the rubber component. It is possible to reduce the tire rolling resistance when the silica blending amount is 10 parts by mass or more with respect to 100 parts by mass of the rubber component, and the rolling resistance is deteriorated when the silica blending amount exceeds 55 parts by mass.

The nitrogen adsorption specific surface area of silica (BET method) is preferably in the range of from 70 to 250 m$^2$/g, more preferably 80 to 240 m$^2$/g. In the case where the nitrogen adsorption specific surface area is 70 m$^2$/g or more, a satisfactory reinforcing effect is achieved to favorably improve wear resistance of the tire. In the case where the nitrogen adsorption specific surface area is less than 250 m$^2$/g, processability of the rubbers during production is good, and good tire driving stability is ensured. The nitrogen adsorption specific surface area is measured by the BET method in accordance with ASTM D3037-81.

It is possible to adjust the volume specific resistivity of the coating rubber to a lower value when metal foil is contained therein in an amount of 1 to 10 parts by mass, preferably 1 to 3 parts by mass with respect to 100 parts by mass of the rubber component. As metal foil, those having a thickness in the range of 10 to 50 μm, a minor diameter (D1) of 0.1 to 0.3 mm, a major diameter (D2) of 0.2 to 0.5 mm, and an aspect ratio (D2/D1) of 2 to 5 are usable.

<Shoulder Part Electroconductive Rubber>

Shoulder part electroconductive rubber 4 in the present invention is made from a rubber having a volume specific resistivity set to less than 1×10$^8$ Ω·cm and disposed between the carcass ply forming carcass 10 described later in this specification and an edge portion of the breaker part and the sidewall part. It is possible to achieve a desired degree of tire electroconductivity improvement effect when the volume specific resistivity of shoulder part electroconductivity rubber 4 is less than 1×10$^8$ Ω·cm. Also, the volume specific resistivity of shoulder part electroconductivity rubber 4 is preferably set to 1×1 Ω·cm or less, more preferably 1×10$^6$ Ω·cm or less. When a rubber composition containing the electroconductive component in a large amount is used, it is possible to reduce electrical resistance, while the rim is easily subjected to rusting due to promotion of an electrochemical reaction in a region where the tire contacts the rim. In order to avoid the rusting, the volume specific resistivity of the shoulder part electroconductive rubber is preferably set to 1×10$^3$ Ω·cm or more, more preferably 1×10$^4$ Ω·cm or more.

The shoulder part electroconductive rubber 4 is formed continuously or discontinuously in the tire circumferential direction between the carcass ply forming the carcass and the edge portion of the breaker and the sidewalls as described above, and a thickness or a shape thereof is not particularly limited.

As the rubber blending of shoulder part electroconductive rubber 4, a composition wherein rubber hardness and the like are adjusted may be used from the view point of imparting electroconductivity by containing carbon black or metal foil in the same manner as in the coating rubber and reducing rubber detachment at both ends of the breaker.

<Conduction Rubber>

In the present invention, the conduction rubber is embedded into the tread part, be partially exposed to a tire contact area, and another part is coupled to the shoulder part electroconductive rubber to effectively discharge static electricity generated during running of the pneumatic tire to the contact area. Though conduction rubber 6 shown in FIG. 1 is embedded at a position at a central part of tread part 7, it is possible to embed a plurality of the conduction rubbers. The width W of the conduction rubber in a tire width direction may be 0.2 to 10 mm, preferably 0.9 to 1.5 mm. Conduction effect is small when the width is less than 0.2 mm, while the contact region of the conduction rubber in the tread part is relatively increased when the width exceeds 10 mm to impair the contact characteristics. Though it is preferable to form the conduction rubber as a continuous layer in the tire circumferential direction, the conduction rubber may be formed discontinuously in the tire circumferential direction.

The volume specific resistivity of the conduction rubber is set to a value smaller than those of the tread rubber, the breaker rubber, and the sidewall rubber. The volume specific resistivity of the conduction rubber is less than $1 \times 10^8$ Ω·cm. In the case where the volume specific resistivity of the conduction rubber is less than $1 \times 10^8$ Ω·cm, electroconductivity of the tire is improved to achieve effect of discharging static electricity. The volume specific resistivity of the conduction rubber is preferably $1 \times 10^7$ Ω·cm or less, more preferably $1 \times 10^6$ Ω·cm or less.

In the present invention, when the volume specific resistivity of the tread rubber, the breaker rubber, and the sidewall rubber are set to $1 \times 10^8$ Ω·cm or more, since the volume specific resistivity of the shoulder part electroconductive rubber and the shoulder part electroconductive rubber coupled to the shoulder part electroconductive rubber are set to values lower than those of the tread rubber, the breaker rubber, and the sidewall rubbers while maintaining the tire performance such as rolling resistance and durability, it is possible to effectively discharge the static electricity generated in the pneumatic tire through the electrical connection passage by the conduction rubber, the shoulder part electroconductive rubber, the conduction rubber, and the like.

It is possible to impart electroconductivity to the conduction rubber of the present invention by adding thereto carbon black or metal foil in the same manner as in the coating rubber as well as to employ blending design for imparting electroconductivity based on the blending of the tread rubber from the view point of improving the contact characteristics.

<Carcass>

Carcass 10 in the present invention is formed of at least one carcass ply aligning a carcass cord. The carcass ply has a structure wherein the carcass cords that are aligned in parallel to each other are embedded in the rubber. Examples of a fiber material for forming the carcass cord include rayon, nylon, polyester, aramid, and the like, and these may be used alone or in combination of two or more. Among the above materials, it is preferable to use rayon since rayon is a natural stock material, and it is preferable to contain 90 mass % or more of rayon with respect to the fiber materials forming the carcass cord.

Volume specific resistivity of the ply rubber is set to a value lower than those of the tread rubber, the breaker rubber, and the sidewall rubber. The volume specific resistivity of the ply rubber is less than $1 \times 10^8$ Ω·cm. In the case where the volume specific resistivity of the ply rubber is less than $1 \times 10^8$ Ω·cm, it is possible to achieve static electricity discharge effect due to improved tire electroconductivity. The volume specific resistivity of the ply rubber is preferably $1 \times 10^7$ Ω·cm or less, more preferably $1 \times 10^6$ Ω·cm or less.

In the present invention, when the volume specific resistivity of the tread rubber, the breaker rubber, and the sidewall rubber are set to $1 \times 10^8$ Ω·cm or more, since the volume specific resistivity of the ply rubber and the coating rubber, the shoulder part electroconductive rubber, and the conduction rubber connected to the ply rubber are set to values lower than those of the tread rubber, the breaker rubber, and the sidewall rubbers while maintaining the tire performance such as rolling resistance and durability, it is possible to further improve the electroconductivity of the tire in cooperation with the shoulder part electroconductive rubber, the conduction rubber, and the like.

For the ply rubber of the present invention, the blending substantially the same as that of the coating rubber may be employed, but it is preferable to contain carbon black or metal foil in order to impart electroconductivity based on the conventional ply rubber composition from the view point of maintaining adhesion to the ply cord.

Further, the ply is disposed so as to contact at least the clinch rubber or the chafer rubber in the present invention. In addition to the structure of continuing the shoulder part electroconductive rubber, the coating rubber, and the conduction rubber, the carcass ply having the low volume specific resistivity is disposed so as to contact the clinch rubber, the chafer rubber, and the shoulder part electroconductive rubber, thereby remarkably improving discharge efficiency of the static electricity through the rim.

<Bead Part Rubber>

As used herein, the bead part rubber means the clinch rubber or the chafer rubber. Static electricity is generated in a driving mechanism during running of the tire, and the static electricity is accumulated in the car and also inside the tire through the rim and the bead part rubber. It is necessary to effectively discharge the static electricity to the contact area through the shoulder part electroconductive rubber. Referring to FIG. 1, it is necessary that the bead part rubber, namely the clinch rubber or the chafer rubber, is electrically connected to the carcass 10. In FIG. 1, the clinch rubber is a rubber layer denoted by reference numeral 3, of which an outside contacts the rim flange in a tire bead part, while an inner part contacts the folding edge of carcass 10.

In FIG. 1, the chafer rubber is so disposed on a bead part outer surface as to contact the flange part from a base part of the rim. As used herein, chafer rubber 2 means a rubber forming a chafer. That is, chafer rubber 2 means a cord coating rubber in the case where the chafer is a cord ply layer or means a rubber of a rubber chafer in the case where the chafer is a rubber chafer. Chafer rubber 2 in FIG. 1 is shown as the one including the above-described meanings.

The present invention includes at least one of the clinch rubber and the chafer rubber as the bead part rubber. The volume specific resistivity of the bead part rubber is less than $1 \times 10^8$ Ω·cm. Good electroconductivity of the tire is achieved by maintaining the volume specific resistivity of the bead part rubber to less than $1 \times 10^8$ Ω·cm. The volume specific resistivity of the bead part rubber is preferably less than $1 \times 10^7$ Ω·cm, more preferably $1 \times 10^6$ Ω·cm. Since the bead part rubber, i.e., the cling rubber and the chafer rubber, is required to have abrasion resistance, rigidity, and hardness, it is possible to adjust electrical resistance by a blending method of imparting electroconductivity by adding carbon black or metal foil in the same manner as in the shoulder part electroconductive rubber or the conduction rubber.

Embodiment 2

Figure 2:
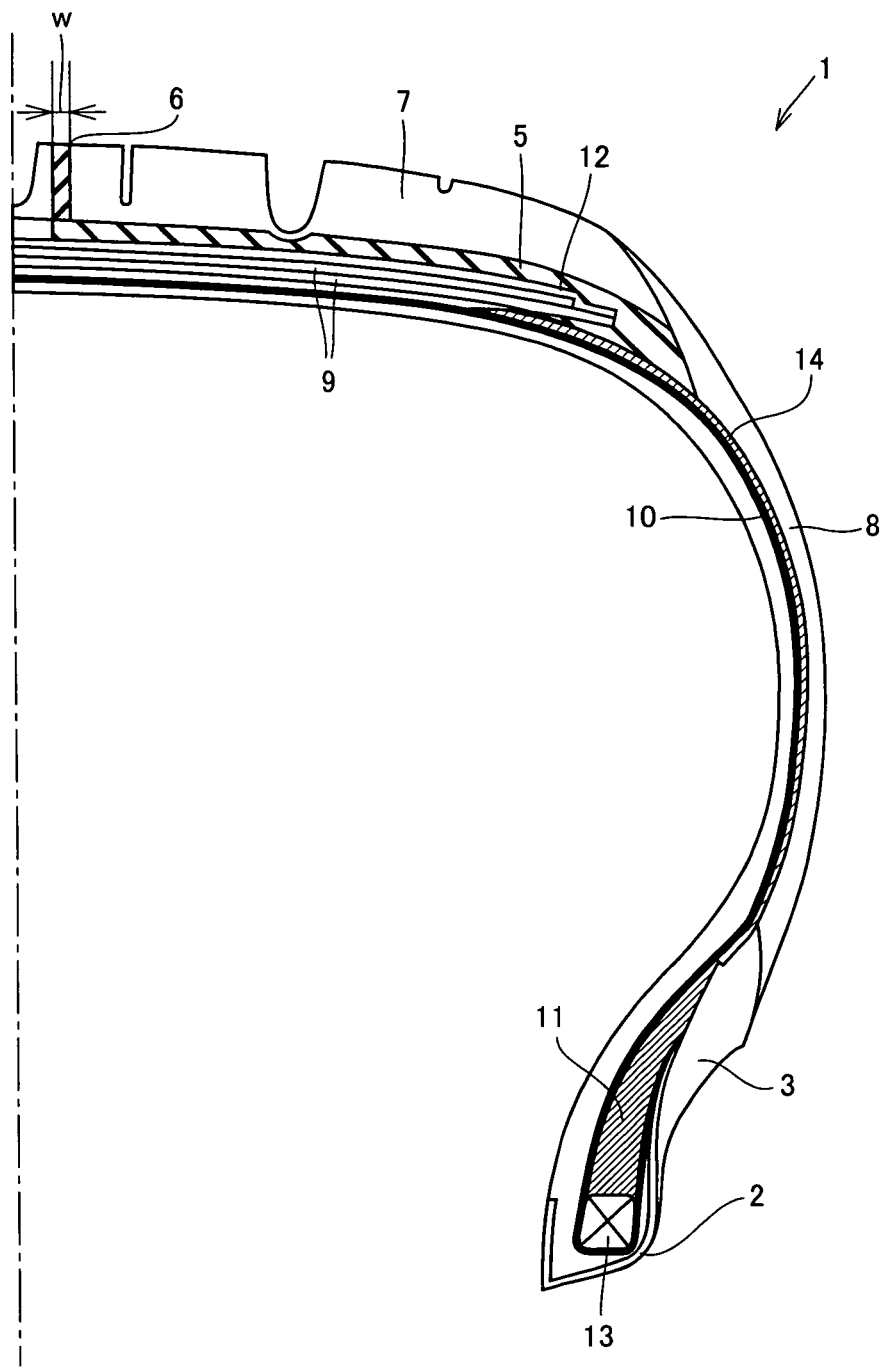
FIG. 2 shows a right half of a sectional view of a pneumatic tire according to Embodiment 2 of the present invention.

One example of a structure of the pneumatic tire of the present invention is as in FIG. 2 in which the upper right half of the cross section of the tire is shown. Tire 1 is provided with tread rubber 7 forming a tread part, sidewall rubber 8 forming a pair of sidewall parts extending from both ends of tread rubber 7 in a tire radially inward direction, clinch rubber 3 forming a clinch part located at an inner end of the sidewall parts, and chafer rubber 2 forming chafer part located at an upper part of a rim. Carcass 10 is bridged over the beat parts on both sides, and a breaker rubber forming a breaker part is disposed at a tire radially outside of carcass 10.

Carcass 10 is formed of at least one carcass ply for aligning a carcass cord, and the carcass ply is folded back from an inner part to an outside in a tire axial direction around bead core 13 and bead apex 11 extending from an upper end of bead core 13 to a sidewall direction through from the tread part and the sidewall part and locked by a locking part. Breaker part 9 is formed of at least two breaker plies that are aligned breaker cords, and the breaker cords are overlapped with orientations thereof being alternated so that the breaker cords intersects with each other. In the pneumatic tire of the present invention, a coating rubber 5 is provided between the tread part and the breaker part.

Embodiment 2 is characterized in that a side part electroconductive rubber 14 having a region for contacting coating rubber 5, being adjacent to carcass 10, and extending from at least the both ends of the breaker part to a position contacting clinch rubber 3 is disposed. Conduction rubber 6 is disposed in tread rubber 7 so as to contact coating rubber 5 and be partially exposed to the contact area and has a structure in which conduction rubber 6 is electrically connected to coating rubber 5, side part electroconductive rubber 14, and clinch rubber 3.

By employing the above structure, it is possible to discharge static electricity generated in the bead part rubber located at the region contacting the rim or the contact region during tire rubbing to the outside of the tire through the electroconductive rubber members.

Only characteristic parts of Embodiment 2 will hereinafter be described, and other structures are substantially the same as those of Embodiment 1.

<Side Part Electroconductive Rubber>

A Side part electroconductive rubber 14 in the present invention has a structure in which side part electroconductive rubber 14 is adjacent to an outside of carcass 10 and extends to the bead part from the both ends of the breaker part through the sidewall part, so that a lower end of side part electroconductive rubber 14 is electrically connected to clinch rubber 3. The volume specific resistivity of the side part electroconductive rubber is set to less than $1\times10^8$ Ω·cm. When the volume specific resistivity of side part electroconductive rubber 14 is less than $1\times10^8$ Ω·cm, it is possible to achieve an effect of improving tire electroconductivity. The volume specific resistivity of the ply rubber is preferably set to $1\times10^7$ Ω·cm or less, more preferably $1\times10^6$ Ω·cm or less. When a rubber composition containing an electroconductive component in a large amount is used, it is possible to reduce electrical resistance, while the rim is easily subjected to rusting due to promotion of an electrochemical reaction in a region at which the tire contacts the rim. In order to avoid the rusting, the volume specific resistivity of the shoulder part electroconductive rubber is preferably set to $1\times10^3$ Ω·cm or more, more preferably $1\times10^4$ Ω·cm or more. The side part electroconductive rubber is disposed adjacent to the outside of the carcass, and a part thereof may be disposed between the carcass and the breaker and may be formed continuously or discontinuously in the tire circumferential direction.

As the rubber blending of side part electroconductive rubber 14, the blending substantially the same as that of the coating rubber may be used, and, from the view point of reducing rubber detachment at both ends of the breaker, it is possible to use a composition wherein rubber hardness and the like are adjusted.

<Carcass>

Carcass 10 in the present invention is formed of at least one carcass ply aligning a carcass cord. The carcass ply has a structure wherein the carcass cords that are aligned in parallel to each other are embedded in the rubber. Examples of a fiber material for forming the carcass cord include rayon, nylon, polyester, aramid, and the like, and these may be used alone or in combination of two or more. Among the above materials, it is preferable to use rayon since rayon is a natural stock material, and it is preferable to contain 90 mass % or more of rayon with respect to the fiber materials forming the carcass cord.

Though the volume specific resistivity of the ply rubber is not particularly limited, the volume specific resistivity may be set in the same manner a in the tread rubber, the breaker rubber, and the sidewall rubber. When the volume specific resistivity is less than $1\times10^8$ Ω·cm, it is possible to improve tire electroconductivity to achieve static electricity discharge effect in cooperation with the adjacent side part electroconductive rubber. In this case, the volume specific resistivity of the ply rubber may be set to $1\times10^7$ Ω·cm or less, more preferably $1\times10^6$ Ω·cm or less.

In the present invention, when the volume specific resistivity of the breaker rubber and the sidewall rubber are set to $1\times10^8$ Ω·cm or more, since the volume specific resistivity of the coating rubber, the side part electroconductive rubber, and the conduction rubber are set to the value lower than those of the breaker rubber and the sidewall rubber while maintaining tire performance such as rolling resistance and durability, it is possible to further improve tire electroconductivity of the tire in cooperation with the coating rubber, the side electroconductive rubber, the conduction rubber, and the like (the static electricity generated in the pneumatic tire).

Further, the side part electroconductive rubber is disposed so as to also contact the bead part rubber. Since the bead part rubber having the low volume specific resistivity and the side part electroconductive rubber and the like are contact with each other in addition to the structure wherein the side part electroconductive rubber, the coating rubber, and the conduction rubber are continuous, it is possible to remarkably improve static electricity discharge efficiency through the rim.

Embodiment 3

Figure 3:
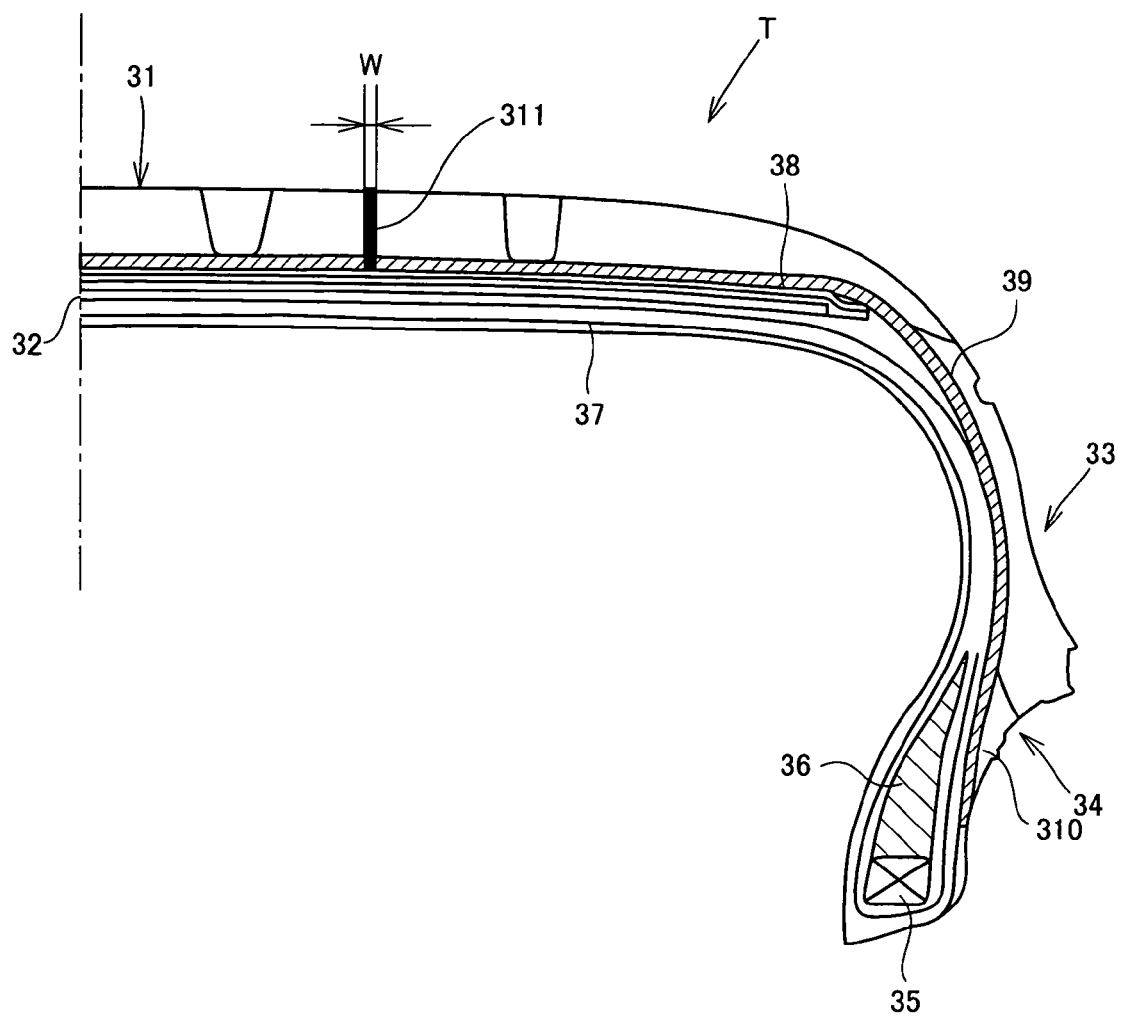
FIG. 3 shows a right half of a sectional view of a pneumatic tire according to Embodiment 3 of the present invention.

Shown in FIG. 3 is a right half of a cross section of a pneumatic tire according to Embodiment 3 of the present invention. Referring to FIG. 3, a pneumatic tire T is provided with a tread part 31, a breaker 32, a sidewall part 33, and a bead part 34 and has a jointless band 38 disposed outside the breaker, a carcass 37 locked with both ends being folded back by a pair of bead cores 35, and a bead apex 36 extending from an upper side of the bead core 35 to a direction of sidewall part 33. Particularly, an entire area electroconductive rubber 39 is provided between carcass 37 and a sidewall rubber and between breaker 32 and tread part 31. An upper end part of entire area electroconductive rubber 39 is coupled to a conduction rubber 311 that is embedded in tread part 31 and exposed to a contact area, while a lower end part of entire area electroconductive rubber 39 is coupled to a clinch rubber 310 formed at bead part 34.

By using the above-described structure, static electricity accumulated inside a car and the tire reaches to conduction rubber 311 through the entire area electroconductive rubber 39 to be discharged to the contact area.

<Entire Area Electroconductive Rubber>

In the present invention, the entire area electroconductive rubber is provided between carcass 37 and the sidewall rubber and between breaker 32 and tread part 31. The upper end part of the entire area electroconductive rubber is coupled to conduction rubber 311 that is embedded in tread part 31 and exposed to the contact area, while the lower end part of the entire area electroconductive rubber is coupled to clinch rubber 310 formed at bead part 34. Though the mode wherein entire area electroconductive rubber 39 is disposed allover the tread part is shown in FIG. 3, entire area electroconductive rubber 39 may be disposed only at an end of the tread part, and it is sufficient that be at least partially coupled to conduction rubber 311. Also, a lower end part of conduction rubber 39 is preferably coupled to the clinch rubber.

In the present invention, it is possible to achieve a desired degree of tire electroconductivity improvement effect when the thickness of entire area electroconductive rubber 39 is 0.2 mm or more, while it is possible to prevent tire rolling resistance from being largely deteriorated when the thickness of entire area electroconductive rubber 39 is 3.0 mm or less. The thickness of the entire area electroconductive rubber is preferably in a range of from 0.5 to 2.0 mm, particularly preferably in a range of from 0.9 to 1.5 mm.

The volume specific resistivity of the entire area electroconductive rubber formed in the pneumatic tire of the present invention is adjusted to less than $1 \times 10^8$ $\Omega \cdot$cm. In the case where the volume specific resistivity of the entire area electroconductive rubber is less than $1 \times 10^8$ $\Omega \cdot$cm, the improvement in tire electroconductivity is confirmed. The volume specific resistivity of the entire area electroconductive rubber is preferably less than $1 \times 10^7$ $\Omega \cdot$cm, more preferably less than $1 \times 10^6$ $\Omega \cdot$cm. It is preferable that the volume specific resistivity of the entire area electroconductive rubber is lowered as possible from the view point of effect of the tire electroconductivity improvement; however, from the view point of preventing the phenomenon that a rim becomes more subject to rusting due to promotion of electrochemical reaction at the portion where the tire contacts the rim when electrical resistance is reduced by addition of a large amount of an electroconductive component, for example, the volume specific resistivity of the entire area electroconductive rubber is preferably set to $1 \times 10^3$ $\Omega \cdot$cm or more, more preferably $1 \times 10^4$ $\Omega \cdot$cm or more.

In the present invention, the entire area electroconductive rubber may preferably contain carbon black in an amount within a range of from 20 to 100 parts by mass with respect to 100 parts by mass of a rubber component. In the case where carbon black is contained in an amount of 20 parts by mass or more with respect to 100 parts by mass of the rubber component, electroconductivity of the entire area electroconductive rubber is increased. Also, in the case where the content of carbon black is 100 parts by mass or less with respect to 100 parts by mass of the rubber component, durability is improved. In the case where the carbon black blending amount is 100 parts by mass with respect to 100 parts by mass of the rubber component, it is the compounding amount is preferably 35 parts by mass or more, more preferably 40 parts by mass or more, and is preferably 80 parts by mass or less, more preferably 70 parts by mass or less.

The nitrogen adsorption specific surface area of carbon black contained in the entire area electroconductive rubber is preferably 100 $m^2$/g or more and 1,500 $m^2$/g or less. Mechanical strength of the coating rubber is good when the nitrogen adsorption specific surface area is 100 $m^2$/g or more, and the nitrogen adsorption specific surface area of 1,500 $m^2$/g or less is preferred from the view point of ensuring processability during production. The nitrogen adsorption specific surface area may more preferably be 105 $m^2$/g or more and is preferably 1,300 $m^2$/g or less, more preferably 1,000 $m^2$/g or less. As the carbon black, wood tar carbon black that is not an oil-derived stock is preferably used.

Silica or the like, for example, may be contained as a filler in the coating rubber in addition to carbon black, but, from the view point of imparting good electroconductivity, carbon black may preferably occupy 8 mass %, more preferably 15 mass % or more, further preferably 100 mass % or more of the fillers.

In the present invention, since the volume specific resistivity of the tread rubber, the breaker rubber, and the sidewall rubber are set to $1 \times 10^8$ $\Omega \cdot$cm or more, and since the volume specific resistivity of the entire area electroconductive rubber and the entire area electroconductive rubber coupled to the entire area electroconductive rubber are set to values lower than those of the tread rubber, the breaker rubber, and the sidewall rubbers while maintaining the tire performance such as rolling resistance and durability, it is possible to effectively discharge the static electricity generated in the pneumatic tire through the entire area electroconductive rubber and the conduction rubber.

In Embodiment 3, it is not always necessary to provide the coating rubber on the upper side of the breaker.

Though it is possible to adapt to the conduction rubber the blending used for the entire area electroconductive rubber, it is possible to employ blending design for imparting electroconductivity based on the blending of the tread rubber from the view point of improving the contact characteristics.

<Bead Part Rubber>

As used herein, a bead part rubber is a term used for collectively referring to a clinch rubber or a chafer rubber. The driving force is transmitted from a driving mechanism through the rim and the bead part rubber, for example the clinch rubber, during tire running, and static electricity generated in the driving mechanism is accumulated inside the car and the tire. It is necessary to effectively discharge the static electricity through the entire area electroconductive rubber to the contact area. Referring to FIG. 3, it is necessary to couple clinch rubber 310 to entire area electroconductive rubber 39.

The volume specific resistivity of the bead part rubber is less than $1 \times 10^8$ $\Omega \cdot$cm. When the volume specific resistivity of the conduction rubber is less than $1 \times 10^8$ $\Omega \cdot$cm, good tire electroconductivity is achieved. The volume specific resistivity of the bead part rubber is preferably less than $1 \times 10^7$ $\Omega \cdot$cm, more preferably less than $1 \times 10^6$ $\Omega \cdot$cm. Since the bead part rubber is required to have abrasion resistance, rigidity, and hardness, it is possible to adjust electrical resistance by employing a blending method in the same manner as in the entire area electroconductive rubber and the conduction rubber in addition to the above blending design.

<Blending Design of Rubber Component>

The coating rubber, the shoulder part electroconductive rubber, the conduction rubber, the ply rubber the chafer rubber, the clinch rubber, the tread rubber, the breaker rubber, and the sidewall rubber is formed of the following rubber compositions, for example.

Preferred examples of the rubber component include a natural rubber (NR), an epoxidized natural rubber, a deproteined natural rubber, and a diene-based synthetic rubber. Examples of the diene-based synthetic rubber include a styrene-butadiene rubber (SBR), a polybutadiene rubber (BR), a polyisoprene rubber (IR), an ethylene-propylene-diene rubber (EPDM), a chloroprene rubber (CR), an acrylonitrilebutadiene rubber (NBR), a butyl rubber (IIR), and the like, and a rubber component containing one or more of the diene-based synthetic rubbers is suitably used. The ethylene-propylene-diene rubber (EPDM) means a rubber containing ethylene-propylene rubber (EPM) and a third diene component. Examples of the third diene component include a non-conjugated diene having 5 to 20 carbon atoms, such as 1,4-pentadiene, 1,4-hexadiene, 1,5-hexadiene, 2,5-dimethyl-1,5-hexadiene, and 1,4-octadiene, or a cyclic diene such as 1,4-cyclohexadiene, cyclooctadiene, dicyclopentadiene, an alkenylnorbornene such as 5-ethylidene-2-norbornene, 5-butylidene-2-norbornene, 2-methallyl-5-norbornene, and 2-isopropenyl-5-norbornene, and the like. Particularly, dicyclopentadiene, 5-ethylidene-2-norbornene, and the like are preferred.

As the rubber component used for the coating rubber, the shoulder part electroconductive rubber, the conduction rubber, the ply rubber, the chafer rubber, and the clinch rubber, the diene-based rubber is preferred, and, among others, the natural rubber (NR), the styrene-butadiene rubber (SBR), the polybutadiene rubber (BR), the polyisoprene rubber (IR), and the epoxidized natural rubber (ENR), the deproteined natural rubber, and the like are preferred.

To the above-described rubber components, it is possible to add the following compounding agents that are generally used in tire rubber compositions as required.

In the present invention, it is preferable to add silica to the tread rubber, the breaker rubber, and the sidewall rubber as described above. In the case of adding silica to the rubber composition, it is preferable to add a silane-based coupling agent, preferably a sulfur-containing silane coupling agent, in an amount of 1 mass % or more and 20 mass % or less to a silica mass. By adding 1 mass % or more of the silane coupling agent, tire abrasion resistance is improved to thereby achieve a reduction in rolling resistance. When the blending amount of the silane coupling agent is 20 mass % or less, the risk for occurrence of scorching during steps for mixing and kneading and extruding the rubber is reduced.

Examples of the sulfur-containing silane coupling agent include 3-trimethoxysilylpropyl-N,N-dimethylthiocarbamoil-tetrasulfide, trimethoxysilylpropyl-mercaptobenzothiazoletetrasulfide, triethoxysilylpropyl-methacylate-monosulfide, dimethoxymethylsilylpropyl-N,N-dimethylthiocarbamoil-tetrasulfide, bis-[3-(triethoxysilyl)-propyl]tetrasulfide, 3-mercaptopropyltrimethoxysilane, and the like. Other usable examples of the silane-based coupling agent include vinyltrichlorosilane, vinyltris(2-methoxyethoxy)silane, γ-glycidoxypropyltrimethoxysilane, γ-methacryloxypropyltrimethoxysilane, γ-(2-aminoethyl)aminopropyltrimethoxysilane, γ-chloropropyltrimethoxysilane, γ-aminopropyltriethoxysilane, and the like.

In the present invention, it is possible to use another coupling agent in accordance with the usage, such as an aluminate-based coupling agent, a titanium-based coupling agent, or the like alone or in combination with the silane-based coupling agent.

It is possible to use for the rubber component another filler such as carbon black, clay, alumina, talc, calcium carbonate, magnesium carbonate, aluminum hydroxide, magnesium hydroxide, magnesium oxide, titanium oxide, and the like alone or in combination of two or more.

It is possible to add a vulcanizing agent, vulcanization accelerator, a softening agent, a plasticizer, an anti-aging agent, a foaming agent, an anti-scorching agent, and the like in addition to the above-described substances.

An organic peroxide or a sulfur-based vulcanizing agent may be used as the vulcanizing agent. Examples of the organic peroxide include benzoyl peroxide, dicumyl peroxide, di-t-butyl peroxide, t-butyl-cumyl peroxide, methylethylketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexine-3 or 1,3-bis(t-butylperoxypropyl)benzene, di-t-butylperoxy-diisopropylbenzene, t-butylperoxybenzene, 2,4-dichlorobenzoylperoxide, 1,1-di-t-butylperoxy-3,3,5-trimethylcyloxane, n-butyl-4,4-di-t-butylperoxyvalelate, and the like. Among the above organic peroxides, dicumyl peroxide, t-butylperoxybenzene, and di-t-butylperoxy-diisopropylbenzene are preferred. As the sulfur-based vulcanizing agent, sulfur, morpholinedisulfide, and the like may be used. Among the above sulfur-based vulcanizing agents, sulfur is preferred.

As the vulcanization accelerator, it is possible to use those containing at least one of sulfenamide-based, thiazole-based, thiuram-based, thiourea-based, guanidine-based, dithiocarbamine-based, aldehyde-amine-based or aldehyde-ammonia-based, imidazoline-based, and xantate-based vulcanization accelerators.

As the anti-aging agent, it is possible to select from amine-based, phenol-based, imidazole-based compounds, a carbamic acid metal salt, and a wax as required.

In the present invention, a softener may be used in combination in order to further improve kneading processability. Examples of the softener include a petroleum softener such as process oil, lubricant oil, paraffin, liquid paraffin, petroleum asphalt, and vaseline, a fatty oil-based softener such as caster oil, flaxseed oil, rapeseed oil, and coconut oil, wax such as tall oil, beeswax, carnauba wax, and lanoline, fatty acid such as linoleic acid, palmitic acid, a stearic acid, and lauric acid, and the like.

Examples of the plasticizer include DMP (dimethyl phthalate), DEP (diethyl phthalate), DBP (dibutyl phthalate), DHP (diheptyl phthalate), DOP (dioctyl phthalate), DINP (diisononyl phthalate), DIDP (diisodecyl phthalate), BBP (butylbenzyl phthalate), DLP (dilauryl phthalate), DCHP (dicyclohexyl phthalate), anhydrous hydrophthalate ester, DOZ (di-2-ethylhexyl azelate), DBS (dibutyl sebacate), DOS (dioctyl sebacate), acetyltriethyl citrate, acetyltributyl citrate, DBM (dibutyl maleate), DOM (2-ethylhexyl maleate), DBF (dibutyl fumarate), and the like.

As the anti-scorching agent for preventing or delaying scorching, organic acid such as anhydrous phthalic acid, salicylic acid, and benzoic acid, a nitroso compound such as N-nitrosodiphenylamine, N-cyclohexylthiophthalimide, and the like may be used.

EXAMPLES

Hereinafter, the present invention will be described in more details based on examples, and the present invention is not limited to the example.

Examples 1 to 3 and Comparative Examples 1 to 5

<Bead Part Rubber: Clinch Rubber and Chafer Rubber>

Beat part rubber compositions A-1, A-2, and A-3 were prepared by a conventional method by mixing and kneading components other than sulfur and a vulcanizing agent of each of blending components shown in Tables 1 and 2 using an airtight bunbury mixer at 150° C. for 4 minutes, and then adding sulfur and the vulcanizing agent, followed by further mixing and kneading the mixture at 95° C. for 2 minutes.

<Preparation of Ply Rubber>

Ply rubber compositions γ-1 and γ-2 were prepared by a conventional method by mixing and kneading components other than sulfur and a vulcanizing agent of each of blending components shown in Table 3 using an airtight bunbury mixer at 150° C. for 4 minutes, and then adding sulfur and the vulcanizing agent, followed by further mixing and kneading the mixture at 95° C. for 2 minutes.

<Preparation of Shoulder Part Electroconductive Rubber, Coating Rubber, and Conduction Rubber>

Shoulder part electroconductive rubber, coating rubber, and conduction rubber compositions C to E were prepared by a conventional method by mixing and kneading components other than sulfur and a vulcanizing agent of each of blending components shown in Tables 4 to 6 using an airtight bunbury mixer at 150° C. for 4 minutes, and then adding sulfur and the vulcanizing agent, followed by further mixing and kneading the mixture at 95° C. for 2 minutes.

<Preparation of Tread Rubber>

Tread rubber compositions F-1, F-2 were prepared by a conventional method by mixing and kneading components other than sulfur and a vulcanizing agent of each of blending components shown in Table 7 using an airtight bunbury mixer at 140° C. for 4 minutes, and then adding sulfur and the vulcanizing agent, followed by further mixing and kneading the mixture at 95° C. for 2 minutes.

<Preparation of Sidewall Rubber>

Ply rubber compositions G-1 and G-2 were prepared by a conventional method by mixing and kneading components other than sulfur and a vulcanizing agent of each of blending components shown in Table 8 using an airtight bunbury mixer at 140° C. for 4 minutes, and then adding sulfur and the vulcanizing agent, followed by further mixing and kneading the mixture at 95° C. for 2 minutes.

<Preparation of Breaker Rubber>

Breaker rubber compositions H—1 and H-2 were prepared by a conventional method by mixing and kneading components other than sulfur and the vulcanizing agent of each of blending components shown in Table 9 using an airtight bunbury mixer at 140° C. for 4 minutes, and then adding sulfur and the vulcanizing agent, followed by further mixing and kneading the mixture at 95° C. for 2 minutes.

TABLE 1

Bead Part Rubber

| | Blending A-1 |
|---|---|
| Natural Rubber | 80 |
| SBR1500 | 20 |
| N220 | 50 |
| Aromatic Oil | 5 |
| Wax | 1.5 |
| Anti-Aging Agent | 1 |
| Stearic Acid | 1.5 |
| Zinc Flower | 3.5 |
| Sulfur | 1.6 |
| Accelerator | 0.8 |
| Volume specific resistivity ($\Omega \cdot cm$) | $10^6$ |

TABLE 2

Bead Part Rubber

| | Blending A-2 | Blending A-3 |
|---|---|---|
| Natural Rubber | 80 | 100 |
| SBR1500 | 20 | — |
| Silica VN3 | — | 65 |
| Silane Coupling Agent | — | 6.5 |
| N220 | 50 | — |
| Aromatic Oil | 5 | — |
| Wax | 1.5 | 1.5 |
| Anti-Aging Agent | 1 | 1 |
| Stearic Acid | 1.5 | 1.5 |
| Zinc Flower | 3.5 | 13.5 |
| Sulfur | 1.6 | 1.4 |
| Accelerator | 0.8 | 2.2 |
| Volume specific resistivity ($\Omega \cdot cm$) | $10^6$ | $10^8$ or more |

TABLE 3

Ply Rubber

| | Blending B-1 | Blending B-2 |
|---|---|---|
| Natural Rubber | 75 | 75 |
| SBR1502 | 25 | 25 |
| N330 | 45 | 20 |
| Silica VN3 | — | 25 |
| Si69 | — | 2.5 |
| Anti-Aging Agent | 2 | 2 |
| Stearic Acid | 1 | 1 |
| Zinc Flower | 3 | 3 |
| Sulfur | 3 | 3 |
| Accelerator | 1 | 1 |
| Volume specific resistivity ($\Omega \cdot cm$) | $10^6$ | $10^8$ or more |

TABLE 4

Shoulder Part Electroconductive Rubber

| | Blending C |
|---|---|
| Natural Rubber | 60 |
| Polybutadiene | 40 |
| N220 | 45 |
| N330 | — |
| Wax | 1 |
| Anti-Aging Agent | 3 |
| Stearic Acid | 1 |
| Zinc Flower | 3 |
| Sulfur | 2 |
| Accelerator | 1 |
| Volume specific resistivity ($\Omega \cdot cm$) | $10^6$ |

TABLE 5

Coating Rubber

| | Blending D |
|---|---|
| Natural Rubber | 75 |
| SBR1502 | 25 |
| N220 | 20 |
| N330 | 25 |
| Anti-Aging Agent | 2 |
| Stearic Acid | 1 |
| Zinc Flower | 3 |
| Sulfur | 3 |
| Accelerator | 1 |
| Volume specific resistivity ($\Omega \cdot cm$) | $10^6$ |

TABLE 6

Conduction Rubber

|  | Blending E |
| --- | --- |
| Natural Rubber | 30 |
| SBR1500 | 70 |
| N220 | 55 |
| Wax | 1.5 |
| Anti-Aging Agent | 2 |
| Stearic Acid | 1 |
| Zinc Flower | 3 |
| Sulfur | 1.8 |
| Accelerator | 1 |
| Volume specific resistivity ($\Omega \cdot cm$) | $10^6$ |

TABLE 7

Tread Rubber

|  | Blending F-1 | Blending F-2 |
| --- | --- | --- |
| SBR1500 | 100 | 100 |
| ISAF | — | 50 |
| VN3 | 50 | — |
| Silane Coupling Agent | 5 | — |
| Wax | 1 | 1 |
| Anti-Aging Agent | 2 | 2 |
| Stearic Acid | 1 | 1 |
| Zinc Flower | 3 | 3 |
| Sulfur | 1.5 | 1.5 |
| Accelerator | 1 | 1 |
| Volume specific resistivity ($\Omega \cdot cm$) | $10^8$ or more | $10^6$ |

TABLE 8

Sidewall Rubber

|  | Blending G-1 | Blending G-2 |
| --- | --- | --- |
| Natural Rubber | 60 | 60 |
| Polybutadiene | 40 | 40 |
| N220 | 45 | — |
| Silica VN3 | — | 45 |
| Silane Coupling Agent | — | 4.5 |
| Wax | 1 | 1 |
| Anti-Aging Agent | 3 | 3 |
| Stearic Acid | 1 | 1 |
| Zinc Flower | 3 | 3 |
| Sulfur | 2 | 2 |
| Accelerator | 1 | 1 |
| Volume specific resistivity ($\Omega \cdot cm$) | $10^6$ | $10^8$ or more |

TABLE 9

Breaker Rubber

|  | Blending H-1 | Blending H-2 |
| --- | --- | --- |
| Natural Rubber | 100 | 100 |
| N330 | — | 55 |
| Silica VN3 | 55 | — |
| Silane Coupling Agent | 5.5 | — |
| Anti-Aging Agent | 2 | 2 |
| Cobalt Stearate | 2 | 2 |
| Stearic Acid | 1 | 1 |
| Zinc Flower | 10 | 10 |
| Insoluble Sulfur | 5.5 | 5.5 |
| Accelerator | 0.9 | 0.9 |
| Volume specific resistivity ($\Omega \cdot cm$) | $10^8$ or more | $10^6$ |

In Tables 1 to 9, details of the blending agents are as follows.

Note 1: natural rubber is TSR20 (trade name) made in Thailand.
Note 2: SBR1500 is styrene-butadiene rubber manufactured by JSR Corporation.
Note 3: SBR1502 is styrene-butadiene rubber manufactured by JSR Corporation.
Note 4: polybutadiene is BR150B (trade name) manufactured by Ube Industries, Ltd.
Note 5: N220 is carbon black manufactured by Cabot Japan K.K. (nitrogen adsorption specific surface area: 111 $m^2/g$; DBP oil absorption amount: 115 ml/100 g)
Note 6: N330 is carbon black manufactured by Mitsubishi Chemical Corporation (nitrogen adsorption specific surface area: 79 $m^2/g$; DBP oil absorption amount: 105 ml/100 g).
Note 7: ISAF is carbon black manufactured by Mitsubishi Chemical Corporation (nitrogen adsorption specific surface area: 115 $m^2/g$; DBP oil absorption amount: 114 ml/100 g).
Note 8: Silica VN3 is VN3 (trade name) manufactured by Degussa Corporation (nitrogen adsorption specific surface area: 210 $m^2/g$).
Note 9: Silane coupling agent is Si69 (trade name) manufactured by Degussa Corporation.
Note 10: Aromatic oil is X140 (trade name) manufactured by Japan Energy Corporation.
Note 11: Wax is Sunnoc N (trade name) manufactured by Ouchi Shinko Chemical Industrial Co., Ltd.
Note 12: An anti-aging agent is Antigen6C manufactured by Sumitomo Chemical Co., Ltd.
Note 13: Stearic acid is Stearic Acid Tsubaki (trade name) manufactured by NOF Corporation.
Note 14: Zinc flower is zinc oxide manufactured by Mitsui Mining & Smelting Co., Ltd.
Note 15: Sulfur is Sulfur Powder (trade name) manufactured by Karuizawa Seirensha K.K.
Note 16: A vulcanizing agent 1 is Nocceler NS-P (trade name) manufactured by Ouchi Shinko Chemical Industrial Co., Ltd.
Note 17: Insoluble sulfur is Myuclon OT20 (trade name) manufactured by Shikoku Chemicals Corporation.

<Production of Pneumatic Tire>

Pneumatic tires (Examples 1 to 3 and Comparative Examples 1 to 5) each having the structure shown in FIG. 1 and the size of 195/65R15 were produced by using the rubber compositions shown in Tables 1 to 9 in combinations shown in Table 10 for a tread part, a sidewall part, a breaker, a clinch rubber, a chafer rubber, a shoulder part electroconductive rubber, and a conduction rubber by an ordinary vulcanization molding method.

Basic structure of the sample tires are as follows.
Carcass Ply:
 Cord angle: 90 degrees in tire circumferential direction.
 Cord material: polyester (1800 denier)
Breaker:
 Cord angle: 17×17 degrees in tire circumferential direction.
 Cord material: steal cord 1×3

Comparative Example 2 has the structure in which the shoulder part electroconductive rubber and the conduction rubber are omitted from the tire structure shown in FIG. 1, and Comparative Example 3 has the structure in which the shoulder part electroconductive is omitted from the tire structure shown in FIG. 1. The thickness of the coating rubber was 1 mm, the thickness of the shoulder part electroconductive rubber was 1 mm, and the width of the conduction rubber was 0.5 mm and continuous in the tire circumferential direction.

<Evaluation of Tire Performance>

Volume Specific Resistivity

Sample pieces each having a thickness of 2 mm and a size of 15 cm×15 cm by using the rubber compositions of Tables 1 to 9 were produced, and each volume specific resistivity was measured by using an electrical resistance meter R8340A (product of ADVANTEST) under the conditions of a voltage of 500 V, a temperature of 25° C., and a moisture of 50%. The results are shown in Table 1. The larger the value is, the higher the volume specific resistivity of the rubber composition.

Rolling Resistance

The pneumatic tires produced as described above were mounted to regular rims, and then a regular inner pressure of 200 kPa was charged. Rolling resistance was measured by using a rolling resistance tester manufactured by STL at a speed of 80 km/h and a load of 4.7 kN. Rolling resistance of Comparative Example 5 was set to 100 by using a rolling resistance coefficient (RRC) obtained by dividing the detected rolling resistance by the load, rolling resistance of each of Examples 1 to 3 and Comparative Examples 1 to 4 is indicated as a relative value. The smaller the value, the smaller the rolling resistance and better the performance. The results are shown in Table 10.

Tire Electroconductivity

The pneumatic tires produced as described above were mounted to regular rims, and then a regular inner pressure of 200 kPa was charged. Each of the tread parts was brought into contact with an iron plate at a load of 4.7 kN to measure an electrical resistance value between the tire rim part and the iron plate at an applied voltage of 100 V. The results are shown in Table 10.

was used for the sidewall rubber, and the electroconductive rubber layer was omitted. Comparative Example 4 is inferior in tire electroconductivity since the rubber composition reduced in electroconductivity was used for the chafer rubber.

Examples 1 to 3 achieved both of improvement in rolling resistance and tire electroconductivity since the electroconductive rubber composition having a volume specific resistivity of $6.1 \times 10^6$ Ω·cm was used for the tire structural part, and the volume specific resistivity of the breaker and the sidewall part was set to $1 \times 10^8$ Ω·cm or more, from which it is apparent that the pneumatic tires according to the present invention are excellent in both of rolling resistance and electroconductivity.

Examples 4 and 5 and Comparative Examples 6 to 9

<Bead Part Rubber: Chafer Rubber>

Components other than sulfur and a vulcanizing agent of each of blending components shown in Table 11 were mixed and kneaded using an airtight bunbury mixer at 150° C. for 4 minutes, sulfur and the vulcanizing agent were added to be mixed and kneaded at 95° C. for 2 minutes, followed by performing an extrusion step and a calendar step in accordance with a conventional method to thereby prepare chafer rubber compositions A1-1, A1-2, and A1-3.

<Preparation of Ply Rubber>

Components other than sulfur and the vulcanizing agent of each of blending components shown in Table 12 were mixed and kneaded using an airtight bunbury mixer at 150° C. for 4 minutes, sulfur and the vulcanizing agent were added to be mixed and kneaded at 95° C. for 2 minutes, followed by performing an extrusion step and a calendar step in accordance with a conventional method to thereby prepare ply rubber compositions B1-1, B1-2, and B1-3.

<Preparation of Shoulder Part Electroconductive Rubber, Coating Rubber, and Conduction Rubber>

Components other than sulfur and the vulcanizing agent of each of blending components shown in Tables 13 to 15 were mixed and kneaded using an airtight bunbury mixer at 150° C. for 4 minutes, sulfur and the vulcanizing agent were added to

TABLE 10

|  |  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Type of Blending | Tread Rubber | F-1 | F-1 | F-1 | F-1 | F-1 | F-1 | F-1 | F-2 |
|  | Sidewall Rubber | G-2 | G-2 | G-2 | G-2 | G-2 | G-1 | G-2 | G-1 |
|  | Breaker Rubber | H-1 | H-1 | H-1 | H-1 | H-2 | H-1 | H-1 | H-2 |
|  | Conduction Rubber | E | E | E | E | — | E | E | E |
|  | Coating Rubber | D | D | D | D | D | D | D | D |
|  | Shoulder Part Electro Conductive Rubber | C | C | C | C | — | — | C | — |
|  | Ply Rubber | B-1 | B-1 | B-1 | B-2 | B-1 | B-1 | B-1 | B-1 |
|  | Chafer Rubber | A-1 | A-3 | A-3 | A-1 | A-1 | A-1 | A-3 | A-3 |
|  | Clinch Rubber | A-3 | A-2 | A-3 | A-3 | A-3 | A-3 | A-3 | A-3 |
|  | Rubber Chafer | A-3 | A-3 | A-2 | A-3 | A-3 | A-3 | A-3 | A-3 |
| Tire Electroconductivity |  | $2.2 \times 10^6$ | $4.0 \times 10^6$ | $3.0 \times 10^6$ | $>10^8$ | $4.1 \times 10^6$ | $3.7 \times 10^6$ | $>10^8$ | $>10^8$ |
| Rolling Resistance |  | 74 | 75 | 75 | 76 | 75 | 80 | 72 | 100 |

Referring to Table 10, Comparative Example 1 is inferior in tire electroconductivity since the rubber composition reduced in electroconductivity was used for the ply rubber. Comparative Example 2 is inferior in tire electroconductivity since the rubber composition reduced in electroconductivity was used for the breaker rubber, and the conduction rubber and the shoulder part electroconductive rubber were omitted. Comparative Example 3 is inferior in tire electroconductivity since the rubber composition increased in electroconductivity be mixed and kneaded at 95° C. for 2 minutes, followed by performing an extrusion step and a calendar step in accordance with a conventional method to thereby prepare shoulder part electroconductive rubber, coating rubber, and conduction rubber compositions C1 to E1.

<Preparation of Tread Rubber>

Components other than sulfur and the vulcanizing agent of a blending component shown in Table 16 were mixed and kneaded using an airtight bunbury mixer at 140° C. for 4 minutes, sulfur and the vulcanizing agent were added to be mixed and kneaded at 95° C. for 2 minutes, followed by performing an extrusion step and a calendar step in accordance with a conventional method to thereby prepare a tread rubber composition F1.

<Preparation of Sidewall Rubber>

Components other than sulfur and the vulcanizing agent of each of blending components shown in Table 17 were mixed and kneaded using an airtight bunbury mixer at 140° C. for 4 minutes, sulfur and the vulcanizing agent were added to be mixed and kneaded at 95° C. for 2 minutes, followed by performing an extrusion step and a calendar step in accordance with a conventional method to thereby prepare sidewall rubber compositions G1-1 and G1-2.

<Preparation of Breaker Rubber>

Components other than sulfur and the vulcanizing agent of each of blending components shown in Table 18 were mixed and kneaded using an airtight bunbury mixer at 140° C. for 4 minutes, sulfur and the vulcanizing agent were added to be mixed and kneaded at 95° C. for 2 minutes, followed by performing an extrusion step and a calendar step in accordance with a conventional method to thereby prepare breaker rubber compositions H1-1 and H1-2.

TABLE 11

Chafer

|  | Blending A1-1 | Blending A1-2 | Blending A1-3 |
|---|---|---|---|
| Natural Rubber | 20 | 20 | 20 |
| SBR1500 | 80 | 80 | 80 |
| N220 | 50 | — | — |
| Silica VN3 | — | 50 | 50 |
| Silane Coupling Agent (Si69) | — | 5 | 5 |
| Aromatic Oil | 5 | 5 | 5 |
| Wax | 1.5 | 1.5 | 1.5 |
| Anti-Aging Agent | 1 | 1 | 1 |
| Stearic Acid | 1.5 | 1.5 | 1.5 |
| Zinc Flower | 3.5 | 3.5 | 3.5 |
| Sulfur | 1.6 | 1.6 | 1.6 |
| Accelerator | 0.8 | 0.8 | 0.8 |
| Volume specific resistivity ($\Omega \cdot cm$) | $1 \times 10^6$ | $1 \times 10^6$ | $1 \times 10^8$ or more |

TABLE 12

Ply Rubber

|  | Blending B1-1 | Blending B1-2 | Blending B1-3 |
|---|---|---|---|
| Natural Rubber | 75 | 75 | 75 |
| SBR1502 | 25 | 25 | 25 |
| N330 | 45 | — | — |
| Silica VN3 | — | 45 | 45 |
| Silane Coupling Agent (Si69) | — | 4.5 | 4.5 |
| Anti-Aging Agent | 2 | 2 | 2 |
| Stearic Acid | 1 | 1 | 1 |
| Zinc Flower | 3 | 3 | 3 |
| Sulfur | 3 | 3 | 3 |
| Accelerator | 1 | 1 | 1 |
| Metal Foil | — | 2 | — |
| Volume specific resistivity ($\Omega \cdot cm$) | $1 \times 10^6$ | $1 \times 10^6$ | $1 \times 10^8$ or more |

TABLE 13

Shoulder Part Electroconductive Rubber

|  | Blending C1 |
|---|---|
| Natural Rubber | 60 |
| Polybutadiene | 40 |
| Silica VN3 | 45 |
| Silane Coupling Agent (Si69) | 4.5 |
| Wax | 1 |
| Anti-Aging Agent | 3 |
| Stearic Acid | 1 |
| Zinc Flower | 3 |
| Sulfur | 2 |
| Accelerator | 1 |
| Metal Foil | 2 |
| Volume specific resistivity ($\Omega \cdot cm$) | $1 \times 10^6$ |

TABLE 14

Coating Rubber

|  | Blending D1 |
|---|---|
| Natural Rubber | 75 |
| SBR1502 | 25 |
| Silica VN3 | 20 |
| Silane Coupling Agent (Si69) | 25 |
| Anti-Aging Agent | 2 |
| Stearic Acid | 1 |
| Zinc Flower | 3 |
| Sulfur | 3 |
| Accelerator | 1 |
| Metal Foil | 2 |
| Volume specific resistivity ($\Omega \cdot cm$) | $1 \times 10^6$ |

TABLE 15

Conduction Rubber

|  | Blending E1 |
|---|---|
| Natural Rubber | 30 |
| SBR1500 | 70 |
| Silica VN3 | 55 |
| Silane Coupling Agent (Si69) | 5.5 |
| Wax | 1.5 |
| Anti-Aging Agent | 2 |
| Stearic Acid | 1 |
| Zinc Flower | 3 |
| Sulfur | 1.8 |
| Accelerator | 1 |
| Metal Foil | 2 |
| Volume specific resistivity ($\Omega \cdot cm$) | $1 \times 10^6$ |

TABLE 16

Tread Rubber

|  | Blending F1 |
|---|---|
| SBR1500 | 100 |
| Silica VN3 | 50 |
| Silane Coupling Agent (Si69) | 5 |
| Wax | 1 |
| Anti-Aging Agent | 2 |
| Stearic Acid | 1 |
| Zinc Flower | 3 |
| Sulfur | 1.5 |
| Accelerator | 1 |
| Volume specific resistivity ($\Omega \cdot cm$) | $1 \times 10^8$ or more |

TABLE 17

Sidewall Rubber

|  | Blending G1-1 | Blending G1-2 |
|---|---|---|
| Natural Rubber | 60 | 60 |
| Polybutadiene | 40 | 40 |
| N220 | 45 | — |
| Silica VN3 | — | 45 |
| Silane Coupling Agent (Si69) | — | 4.5 |
| Wax | 1 | 1 |
| Anti-Aging Agent | 3 | 3 |
| Stearic Acid | 1 | 1 |
| Zinc Flower | 3 | 3 |
| Sulfur | 2 | 2 |
| Accelerator | 1 | 1 |
| Volume specific resistivity ($\Omega \cdot cm$) | $1 \times 10^6$ | $1 \times 10^8$ or more |

TABLE 18

Breaker Rubber

|  | Blending H2-1 | Blending H2-2 |
|---|---|---|
| Natural Rubber | 100 | 100 |
| N330 | — | 55 |
| Silica VN3 | 55 | — |
| Silane Coupling Agent (Si69) | 5.5 | — |
| Anti-Aging Agent | 2 | 2 |
| Cobalt Stearate | 2 | 2 |
| Stearic Acid | 1 | 1 |
| Zinc Flower | 10 | 10 |
| Insoluble Sulfur | 5.5 | 5.5 |
| Accelerator | 0.9 | 0.9 |
| Volume specific resistivity ($\Omega \cdot cm$) | $1 \times 10^8$ or more | $1 \times 10^6$ |

In Tables 11 to 18, details of the blending agents are as follows.
Note 1: natural rubber is TSR20 (trade name) made in Thailand.
Note 2: SBR1500 is styrene-butadiene rubber manufactured by JSR Corporation.
Note 3: SBR1502 is styrene-butadiene rubber manufactured by JSR Corporation.
Note 4: polybutadiene is BR150B (trade name) manufactured by Ube Industries, Ltd.
Note 5: N220 is carbon black manufactured by Cabot Japan K.K. (nitrogen adsorption specific surface area: 111 $m^2/g$; DBP oil absorption amount: 115 ml/100 g)
Note 6: N330 is carbon black manufactured by Mitsubishi Chemical Corporation (nitrogen adsorption specific surface area: 79 $m^2/g$; DBP oil absorption amount: 105 ml/100 g).
Note 7: Silica VN3 is VN3 (trade name) manufactured by Degussa Corporation (nitrogen adsorption specific surface area: 210 $m^2/g$).
Note 8: Silane coupling agent is Si69 (trade name) manufactured by Degussa Corporation.
Note 9: Aromatic oil is X140 (trade name) manufactured by Japan Energy Corporation.
Note 10: Wax is Sunnoc N (trade name) manufactured by Ouchi Shinko Chemical Industrial Co., Ltd.
Note 11: An anti-aging agent is Antigen6C manufactured by Sumitomo Chemical Co., Ltd.
Note 12: Stearic acid is Stearic Acid Tsubaki (trade name) manufactured by NOF Corporation.
Note 13: Zinc flower is zinc oxide manufactured by Mitsui Mining & Smelting Co., Ltd.
Note 14: Sulfur is Sulfur Powder (trade name) manufactured by Karuizawa Seirensha K.K.
Note 15: A vulcanizing agent 1 is Nocceler NS-P (trade name) manufactured by Ouchi Shinko Chemical Industrial Co., Ltd.
Note 16: Insoluble sulfur is Myuclon OT20 (trade name) manufactured by Shikoku Chemicals Corporation.
Note 17: Metal sulfur has a thickness of 10 to 50 μm, a minor diameter of 0.1 to 9.3 mm, and a major diameter of 0.2 to 0.5 mm.

<Production of Pneumatic Tire>

Pneumatic tires (Examples 4 and 5 and Comparative Examples 6 to 9) each having the structure shown in FIG. 1 and the size of 195/65R15 were produced by using the rubber compositions shown in Tables 11 to 18 in combinations shown in Table 19 for a tread part, a sidewall part, a breaker, a clinch rubber, a chafer rubber, a shoulder part electroconductive rubber, and a conduction rubber by an ordinary vulcanization molding method.

Basic structure of the sample tires are as follows.
Carcass Ply:
 Cord angle: 90 degrees in tire circumferential direction.
 Cord material: polyester (1670 dtex/2)
Breaker:
 Cord angle: 24×24 degrees in tire circumferential direction.
 Cord material: steal cord (2+2×0.25)

The blending (B1-3) increased in volume specific resistivity is used for the ply rubber in Comparative Example 6, and Comparative Example 7 has the structure in which the shoulder part electroconductive rubber and the conduction rubber are omitted from the tire structure shown in FIG. 1. Comparative Example 8 has the structure in which the shoulder part electroconductive is omitted from the tire structure shown in FIG. 1. The blending (A1-3) increased in volume specific resistivity is used for the chafer rubber in Comparative Example 9.

The thickness of the coating rubber was 1 mm, the thickness of the shoulder part electroconductive rubber was 1 mm, and the width of the conduction rubber was 3 mm and continuous in the tire circumferential direction.

<Evaluation of Tire Performance>

Volume Specific Resistivity

Sample pieces each having a thickness of 2 mm and a size of 15 cm×15 cm by using the rubber compositions of Tables 11 to 18 were produced, and each volume specific resistivity was measured by using an electrical resistance meter R8340A (product of ADVANTEST) under the conditions of a voltage of 500 V, a temperature of 25° C., and a moisture of 50%. The results are shown in Table 1. The larger the value is, the higher the volume specific resistivity of the rubber composition.

Rolling Resistance

The pneumatic tires produced as described above were mounted to regular rims, and then a regular inner pressure of 200 kPa was charged. Rolling resistance was measured by using a rolling resistance tester manufactured by STL at a speed of 80 km/h and a load of 4.7 kN. Rolling resistance of Comparative Example 6 was set to 100 by using a rolling resistance coefficient (RRC) obtained by dividing the detected rolling resistance by the load, rolling resistance of each of Examples 4 and 5 and Comparative Examples 7 to 9 is indicated as a relative value. The smaller the value, the smaller the rolling resistance and better the performance. The results are shown in Table 19.

Tire Electroconductivity

The pneumatic tires produced as described above were mounted to regular rims, and then a regular inner pressure of 200 kPa was charged. Each of the tread parts was brought into contact with an iron plate at a load of 4.7 kN to measure an electrical resistance value between the tire rim part and the iron plate at an applied voltage of 100 V. The results are shown in Table 19.

TABLE 19

|  |  | Example 4 | Example 5 | Comparative Example 6 | Comparative Example 7 | Comparative Example 8 | Comparative Example 9 |
|---|---|---|---|---|---|---|---|
| Type of Blending | Tread Rubber | F | F | F | F | F | F |
|  | Sidewall Rubber | G-2 | G-2 | G-2 | G-2 | G-1 | G-2 |
|  | Breaker Rubber | H-1 | H-1 | H-1 | H-2 | H-1 | H-1 |
|  | Conduction Rubber | E | E | E | — | E | E |
|  | Coating Rubber | D | D | D | D | D | D |
|  | Shoulder Part Electro Conductive Rubber | C | C | C | — | — | C |
|  | Ply Rubber | B-1 | B-2 | B-3 | B-1 | B-1 | B-1 |
|  | Chafer Rubber | A-1 | A-2 | A-1 | A-1 | A-1 | A-3 |
| Tire Electroconductivity |  | $2.2 \times 10^6$ | $2.2 \times 10^6$ | $>10^8$ | $4.1 \times 10^6$ | $3.7 \times 10^6$ | $>10^8$ |
| Rolling Resistance |  | 100 | 98 | 100 | 102 | 101 | 101 |

Referring to Table 19, Comparative Example 6 is inferior in tire electroconductivity since the rubber composition reduced in electroconductivity was used for the ply rubber. Comparative Example 7 is inferior in tire electroconductivity since the rubber composition reduced in electroconductivity was used for the breaker rubber, and since the conduction rubber and the shoulder part electroconductive rubber were omitted. Comparative Example 8 is inferior in tire electroconductivity since the rubber composition increased in electroconductivity was used for the sidewall rubber, and since the electroconductive rubber layer was omitted. Comparative Example 9 is inferior in tire electroconductivity since the rubber composition reduced in electroconductivity was used for the chafer rubber.

Examples 4 and 5 achieved both of reduction in rolling resistance and improvement in tire electroconductivity since the electroconductive rubber composition having the volume specific resistivity of $6.1 \times 10^6$ Ω·cm was used for a tire structural part, and since the volume specific resistivity of a tread part, a breaker, and a sidewall part was set to $1.0 \times 10^8$ Ω·cm or more, from which it is apparent that the pneumatic tires according to the present invention are capable of achieving the reduction in rolling resistance and excellent in electroconductivity.

Examples 6 and 7 and Comparative Examples 10 and 11

<Preparation of Side Part Electroconductive Rubber, Coating Rubber, and Conduction Rubber>

Components other than sulfur and the vulcanizing agent of each of blending components shown in Table 20 were mixed and kneaded using an airtight bunbury mixer at 150° C. for 4 minutes, sulfur and the vulcanizing agent were added to be mixed and kneaded at 95° C. for 2 minutes, followed by performing an extrusion step and a calendar step in accordance with a conventional method to thereby prepare side part electroconductive rubber, coating rubber, and conduction rubber compositions C2 to E2.

<Preparation of Tread Rubber, Sidewall Rubber, Breaker Rubber, and Clinch Rubber>

Components other than sulfur and the vulcanizing agent of each of blending components shown in Table 21 to 24 were mixed and kneaded using an airtight bunbury mixer at 140° C. for 4 minutes, sulfur and the vulcanizing agent were added to be mixed and kneaded at 95° C. for 2 minutes, followed by performing an extrusion step and a calendar step in accordance with a conventional method to thereby prepare tread rubber compositions F.

TABLE 20

|  |  | Coating Rubber/ Conduction Rubber | | | | Side Part Electroconductive Rubber | | | |
|---|---|---|---|---|---|---|---|---|---|
| | Blending | A2 | B2 | C2 | D2 | E2 | F2 | G2 | H2 |
| Diene-Based Rubber | NR (TSR20 grade) | 100 | 100 | 100 | 100 | 100 | 100 | 100 | 100 |
| Carbon | N330 (product of Mitsubishi Chemical Corporation) | 55 | — | — | — | 50 | — | — | — |
| Silica | VN3 (product of Degussa Corporation) | — | 55 | 50 | 40 | — | 50 | 45 | 35 |
| Carbon | Printex XE2B (product of Degussa Corporation) | — | — | 5 | 15 | — | — | 5 | 15 |
| Processed Oil | Diana Process PS32 (product of Idemitsu Kosan Co., Ltd.) | 5 | — | — | — | 10 | — | — | — |
| Soybean Oil | Soybean Refined Oil (product of Nissin Oillio Group, Ltd.) | — | 5 | 5 | 5 | — | 10 | 10 | 10 |
| Wax | Sunnoc Wax (product of Ouchi Shinko Chemical Industrial Co., Ltd.) | 2 | 2 | 2 | 2 | — | — | — | — |
| Anti-Aging Agent | Santflex 13 (Product of Flexsys) | 2 | 2 | 2 | 2 | 4 | 4 | 4 | 4 |
| Stearic Acid | Kiri (product of NOF Corporation) | 2 | 2 | 2 | 2 | 2 | 2 | 2 | 2 |
| Zinc Flower | Zinc Oxide No. 1 (product of Mitsui Mining & Smelting Co., Ltd.) | 5 | 5 | 5 | 5 | 5 | 5 | 5 | 5 |
| Coupling Agent | Si75 (product of Degussa Corporation) | — | 5 | 4 | 3 | — | 5 | 4 | 3 |
| Sulfur | Crystex HSOT20 (Product of Flexsys) | 5 | 5 | 5 | 5 | 1.5 | 1.5 | 1.5 | 1.5 |
| Vulcanization Accelerator | Nocceler (product of Ouchi Shinko Chemical Industrial Co., Ltd.) | 2 | 2 | 2 | 2 | 0.75 | 0.75 | 0.75 | 0.75 |
| Volume Specific Resistivity | $\log_{10} R$ | 4.8 | 10.5 | 7.8 | 5.8 | 5.0 | 11.1 | 7.1 | 5.3 |
| Ratio of Materials Derived from Stocks other than Petroleum (%) | | 63 | 94 | 92 | 87 | 63 | 95 | 92 | 87 |

In Table 20, a nitrogen adsorption specific surface area of the carbon (Printex XE2B) is 880 m²/g.

TABLE 21

Clinch Rubber

|  | Blending I2 |
|---|---|
| Natural Rubber | 20 |
| SBR1500 | 80 |
| N220 | 50 |
| Aromatic Oil | 5 |
| Wax | 1.5 |
| Anti-Aging Agent | 1 |
| Stearic Acid | 1.5 |
| Zinc Flower | 3.5 |
| Sulfur | 1.6 |
| Accelerator | 0.8 |
| Volume specific resistivity ($\Omega \cdot cm$) | $1 \times 10^6$ |

TABLE 22

Tread Rubber

|  | Blending J2 |
|---|---|
| Natural Rubber | 100 |
| Silica VN3 | 50 |
| Silane Coupling Agent | 5 |
| Wax | 1 |
| Anti-Aging Agent | 2 |
| Stearic Acid | 1 |
| Zinc Flower | 3 |
| Sulfur | 1.5 |
| Accelerator | 1 |
| Volume specific resistivity ($\Omega \cdot cm$) | $1 \times 10^{11}$ |

TABLE 23

Sidewall Rubber

|  | Blending K2 |
|---|---|
| Natural Rubber | 100 |
| Silica VN3 | 45 |
| Silane Coupling Agent | 4.5 |
| Wax | 1 |
| Anti-Aging Agent | 3 |
| Stearic Acid | 1 |
| Zinc Flower | 3 |
| Sulfur | 2 |
| Accelerator | 1 |
| Volume specific resistivity ($\Omega \cdot cm$) | $1 \times 10^{11}$ |

TABLE 24

Breaker Rubber

|  | Blending L2 |
|---|---|
| Natural Rubber | 100 |
| N330 | — |
| Silica VN3 | 55 |
| Silane Coupling Agent | 5.5 |
| Anti-Aging Agent | 2 |
| Cobalt Stearate | 2 |
| Stearic Acid | 1 |
| Zinc Flower | 10 |
| Insoluble Sulfur | 5.5 |
| Accelerator | 0.9 |
| Volume specific resistivity ($\Omega \cdot cm$) | $1 \times 10^{11}$ |

In Tables 21 to 24, details of the blending agents are as follows.

Note 1: natural rubber is TSR20 (trade name) made in Thailand.
Note 2: SBR1500 is styrene-butadiene rubber manufactured by JSR Corporation.
Note 3: N220 is carbon black manufactured by Cabot Japan K.K. (nitrogen adsorption specific surface area: 111 m²/g; DBP oil absorption amount: 115 ml/100 g)
Note 4: N330 is carbon black manufactured by Mitsubishi Chemical Corporation (nitrogen adsorption specific surface area: 79 m²/g; DBP oil absorption amount: 105 ml/100 g).
Note 5: Silica VN3 is VN3 (trade name) manufactured by Degussa Corporation (nitrogen adsorption specific surface area: 210 m²/g).
Note 6: A silane coupling agent is Si69 (trade name) manufactured by Degussa Corporation.
Note 7: Aromatic oil is X140 (trade name) manufactured by Japan Energy Corporation.
Note 8: Wax is Sunnoc N (trade name) manufactured by Ouchi Shinko Chemical Industrial Co., Ltd.
Note 9: An anti-aging agent is Antigen6C manufactured by Sumitomo Chemical Co., Ltd.
Note 10: Stearic acid is Stearic Acid Tsubaki (trade name) manufactured by NOF Corporation.
Note 11: Zinc flower is zinc oxide manufactured by Mitsui Mining & Smelting Co., Ltd.
Note 12: Sulfur is Sulfur Powder (trade name) manufactured by Karuizawa Seirensha K.K.
Note 13: A vulcanizing agent 1 is Nocceler NS-P (trade name) manufactured by Ouchi Shinko Chemical Industrial Co., Ltd.
Note 14: Insoluble sulfur is Myuclon OT20 (trade name) manufactured by Shikoku Chemicals Corporation.

Pneumatic tires (Examples 6 and 7 and Comparative Examples 10 and 11) each having the structure shown in FIG. 2 and the size of 195/65R15 were produced by using the rubber compositions shown in Tables 20 to 24 in combinations shown in Table 25 for a tread part, a sidewall part, a breaker, a clinch rubber, a chafer rubber, a shoulder part electroconductive rubber, and a conduction rubber by an ordinary vulcanization molding method. Basic structure of the sample tires are as follows.

Carcass Ply:
  Cord angle: 90 degrees in tire circumferential direction.
  Cord material: polyester (1500 denier, 1670 dtex/2)
Breaker:
  Cord angle: 24×24 degrees in tire circumferential direction.
  Cord material: steal The thickness of the coating rubber was 0.8 mm, the thickness of the side part electroconductive rubber was 1 mm, and the width of the conduction rubber was 1.5 mm and continuous in the tire circumferential direction.

<Evaluation of Tire Performance>

Volume Specific Resistivity

Sample pieces each having a thickness of 2 mm and a size of 15 cm×15 cm by using the rubber compositions of Tables 20 to 24 were produced, and each volume specific resistivity was measured by using an electrical resistance meter R8340A (product of ADVANTEST) under the conditions of a voltage of 500 V, a temperature of 25° C., and a moisture of 50%. The results are shown in Tables 20 to 24. The larger the value is, the higher the volume specific resistivity of the rubber composition.

Rolling Resistance

The pneumatic tires produced as described above were mounted to regular rims, and then a regular inner pressure of 2.0 MPa was charged. Rolling resistance was measured by using a rolling resistance tester manufactured by STL at a speed of 80 km/h and a load of 4.7 kN. By using a rolling resistance coefficient (RRC) obtained by dividing the detected rolling resistance by the load, rolling resistance of each of Examples 6 and 7 and Comparative Examples 10 and 11 was prepared by way of the following expression:

Rollin resistance=Rolling resistance coefficient of Comparative Example 1/Rolling resistance of each of Examples 6 and 7 and Comparative Example 111×100 with the rolling resistance of the Comparative Example 10 being set to 100. The smaller the value, the smaller the rolling resistance and better the performance. The results are shown in Table 25.

Tire Electroconductivity

The pneumatic tires produced as described above were mounted to regular rims, and then a regular inner pressure of 2.0 MPa was charged. Each of the tread parts was brought into contact with an iron plate at a load of 4.7 kN to measure an electrical resistance value between the tire rim part and the iron plate at an applied voltage of 100V. The results are shown in Table 25.

TABLE 25

|  | Example 6 | Example 7 | Comparative Example 10 | Comparative Example 11 |
| --- | --- | --- | --- | --- |
| Undertread | C | D | A | B |
| Conduction Rubber | C | D | A | B |
| Side Part Electroconductive Rubber | G | H | E | F |
| Clinch Rubber | I | I | I | I |
| Tread Rubber | J | J | J | J |
| Sidewall Rubber | K | K | K | K |
| Breaker Rubber | L | L | L | L |
| Tire Electroconductivity | $1 \times 10^7$ | $1 \times 10^6$ | $1 \times 10^7$ | $1 \times 10^{11}$ |
| Rolling Resistance | 106 | 104 | 100 | 103 |

Referring to Table 25, Comparative Example 10 does not contain any silica and electroconductive carbon black in the coating rubber, the conduction rubber, and the side electroconductive rubber. Comparative Example 11 is an example of not contain any carbon black in the coating rubber, the conduction rubber and the side electroconductive rubber.

Examples 6 and 7 achieved both of improvements in rolling resistance and tire electroconductivity since the electroconductive rubber composition having the volume specific resistivity of less than $1 \times 10^8$ Ω·cm was used for the coating rubber, the conduction rubber, and the side part electroconductive rubber, and since the volume specific resistivity of the tread part, the breaker, and the sidewall part was set to $1 \times 10^8$ Ω·cm or more, from which it is apparent that the pneumatic tires according to the present invention are excellent in both of the rolling resistance and electroconductivity.

Example 8 and Comparative Examples 12 to 17

<Preparation of Entire Area Electroconductive Rubber and Conduction Rubber Composition>

Entire area electroconductive rubber and conduction rubber compositions A3 to C3 were prepared by a conventional method by mixing and kneading components other than sulfur and a vulcanizing agent of each of blending components shown in Table 26 using an airtight bunbury mixer at 150° C. for 4 minutes, and then adding sulfur and the vulcanizing agent, followed by further mixing and kneading the mixture at 95° C. for 2 minutes.

<Preparation of Tread Rubber>

Tread rubber compositions D3 were prepared by a conventional method by mixing and kneading components other than sulfur and a vulcanizing agent of each of blending components shown in Table 26 using an airtight bunbury mixer at 140° C. for 4 minutes, and then adding sulfur and the vulcanizing agent, followed by further mixing and kneading the mixture at 95° C. for 2 minutes.

<Preparation of Sidewall Rubber Composition>

Sidewall rubber compositions E3 and F3 were prepared by a conventional method by mixing and kneading components other than sulfur and the vulcanizing agent of each of blending components shown in Table 26 using an airtight bunbury mixer at 140° C. for 4 minutes, and then adding sulfur and the vulcanizing agent, followed by further mixing and kneading at 95° C. for 2 minutes.

<Preparation of Breaker Rubber Composition>

Breaker rubber compositions G3 and H3 were prepared by a conventional method by mixing and kneading components other than sulfur and the vulcanizing agent of each of blending components shown in Table 26 using an airtight bunbury mixer at 140° C. for 4 minutes, and then adding sulfur and the vulcanizing agent, followed by further mixing and kneading at 95° C. for 2 minutes.

<Preparation of Clinch Rubber Composition>

Breaker rubber compositions I3 and J3 were prepared by a conventional method by mixing and kneading components other than sulfur and the vulcanizing agent of each of blending components shown in Table 26 using an airtight bunbury mixer at 140° C. for 4 minutes, and then adding sulfur and the vulcanizing agent, followed by further mixing and kneading at 95° C. for 2 minutes.

Measurement of Volume Specific Resistivity of Rubber Composition

Volume specific resistivity of each of the rubber compositions A3 to J3 was measured after vulcanization molding at 150° C. for 30 minutes, and the results are shown in Table 26.

TABLE 26

|  | Electroconductive Rubber/ Conduction Rubber | | | Tread Rubber | Sidewall Rubber | | Breaker Rubber | | Clinch Rubber | |
| --- | --- | --- | --- | --- | --- | --- | --- | --- | --- | --- |
| Type of Blending | A3 | B3 | C3 | D3 | E3 | F3 | G3 | H3 | I3 | J3 |
| Natural Rubber[Note 1] | 100 | 100 | 100 | 100 | 100 | 100 | 100 | 100 | 100 | 100 |
| Wood Tar Carbon[Note 2] | 45 | 20 | — | — | — | 45 | — | 55 | 30 | — |
| Silica VN3[Note 3] | — | — | 45 | 50 | 45 | — | 55 | — | 60 | 90 |
| Silane Coupling Agent[Note 4] | — | — | — | 5 | 4.5 | — | 5.5 | — | 6 | 9 |
| Wax[Note 5] | 1 | 1 | 1 | 1 | 1 | 1 | — | — | 1 | 1 |
| Anti-Aging Agent[Note 6] | 3 | 3 | 3 | 2 | 3 | 3 | 2 | 2 | 3 | 3 |
| Cobalt Stearate | — | — | — | — | — | — | 2 | 2 | — | — |

TABLE 26-continued

| | Electroconductive Rubber/ Conduction Rubber | | | Tread Rubber | Sidewall Rubber | | Breaker Rubber | | Clinch Rubber | |
|---|---|---|---|---|---|---|---|---|---|---|
| Type of Blending | A3 | B3 | C3 | D3 | E3 | F3 | G3 | H3 | I3 | J3 |
| Stearic Acid(Note 7) | 1 | 1 | 1 | 1 | 1 | 1 | 1 | 1 | 1 | 1 |
| Zinc Flower(Note 8) | 3 | 3 | 3 | 3 | 3 | 3 | 10 | 10 | 3 | 3 |
| Sulfur(Note 9) | 2 | 2 | 2 | 1.5 | 2 | 2 | 5.5(Note 11) | 5.5(Note 11) | 2 | 2 |
| Accelerator(Note 10) | 1 | 1 | 1 | 1 | 1 | 1 | 0.9 | 0.9 | 3 | 3 |
| Volume specific resistivity ($\Omega \cdot cm$) | $10^6$ | $10^7$ | $10^8$ or more | $10^8$ or more | $10^8$ or more | $10^6$ | $10^8$ or more | $10^6$ | $10^6$ | $10^8$ or more |

(Note 1)natural rubber is TSR20 (trade name) made in Thailand.
(Note 2)Wood tar carbon black is produced by an oil furnace method by using a wood tar generated as a byproduct when producing charcoal as a raw material. A nitrogen adsorption specific surface area is 125 m$^2$/g, and a DBP oil absorption amount is 105 ml/100 g.
(Note 3)Silica VN3 is VN3 (trade name) manufactured by Degussa Corporation (nitrogen adsorption specific surface area: 210 m$^2$/g).
(Note 4)A silane coupling agent is Si69 (trade name) manufactured by Degussa Corporation.
(Note 5)Wax is Sunnoc N (trade name) manufactured by Ouchi Shinko Chemical Industrial Co., Ltd.
(Note 6)An anti-aging agent is Antigen6C manufactured by Sumitomo Chemical Co., Ltd.
(Note 7)Stearic acid is Stearic Acid Tsubaki (trade name) manufactured by NOF Corporation.
(Note 8)Zinc flower is zinc oxide manufactured by Mitsui Mining & Smelting Co., Ltd.
(Note 9)Sulfur is Sulfur Powder (trade name) manufactured by Karuizawa Seirensha K.K.
(Note 10)A vulcanizing agent 1 is Nocceler NS-P (trade name) manufactured by Ouchi Shinko Chemical Industrial Co., Ltd.
(Note 11)Sulfur is insoluble sulfur which is Myuclon OT20 (trade name) manufactured by Shikoku Chemicals Corporation.

<Production of Pneumatic Tire>

Figure 4:
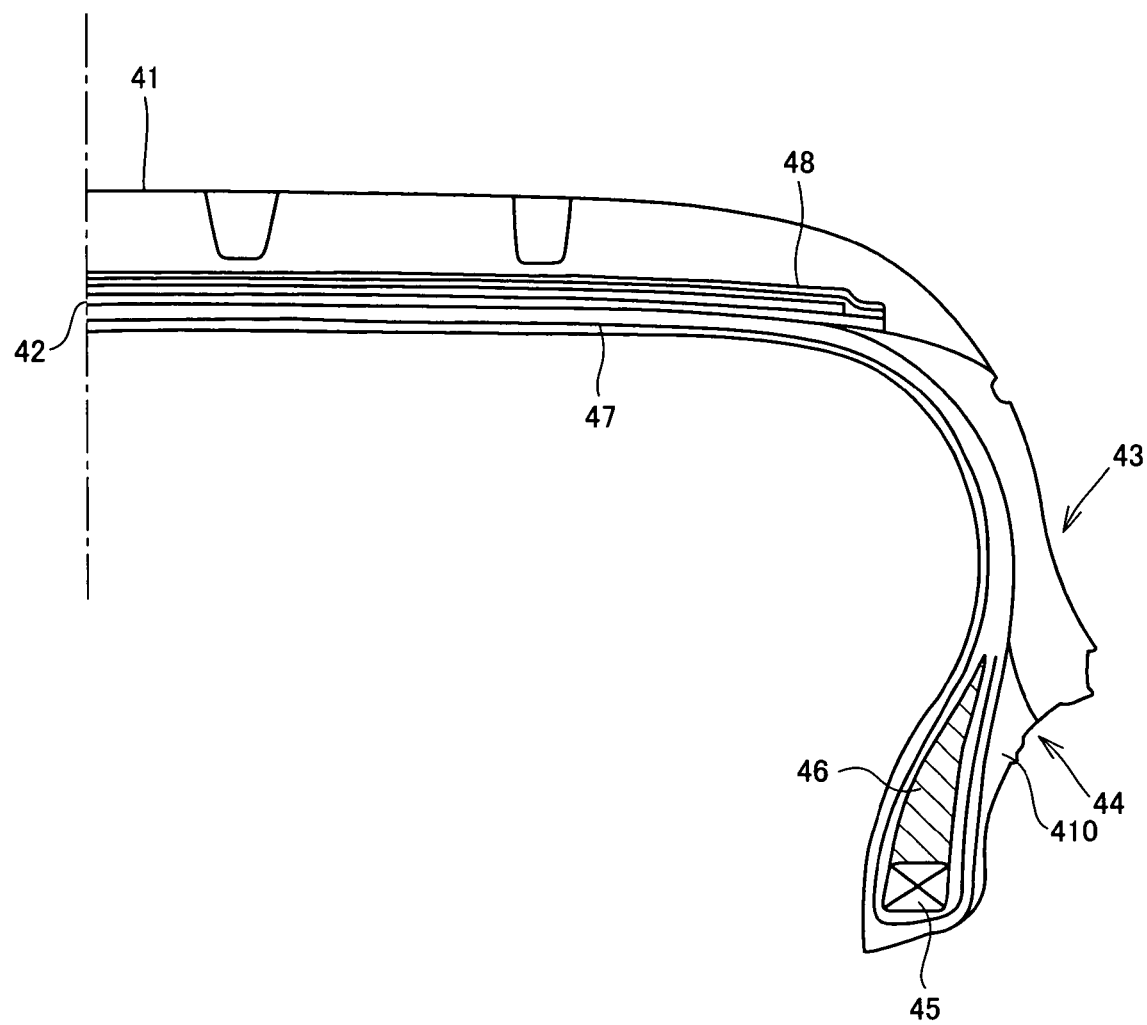
FIG. 4 shows a right half of a sectional view of a conventional pneumatic tire.

Pneumatic tires (Example 8 and Comparative Examples 12, 13, and 17) each having the structure shown in FIG. 3 and the size of 195/65R15 and pneumatic tires (Comparative Examples 14 to 16) each having the structure shown in FIG. 4 and the size of 195/65R15 were produced by using the rubber compositions prepared by the above-described methods in combinations shown in Table 27 for the tread part, the sidewall part, the breaker, the clinch rubber, the entire area electroconductive rubber, and the conduction rubber by an ordinary vulcanization molding method.

The conduction rubber and the entire area electroconductive rubber are formed on the tire of FIG. 3, and these members are not formed on the tire of FIG. 4. Referring to FIG. 3, a thickness of the entire area electroconductive rubber is 1.0 mm, and the entire area electroconductive rubber is continuous in the tire circumferential direction.

Volume Specific Resistivity

Sample pieces each having a thickness of 2 mm and a size of 15 cm×15 cm by using the rubber compositions of Table 26 were produced, and each volume specific resistivity was measured by using an electrical resistance meter R8340A (product of ADVANTEST) under the conditions of a voltage of 500 V, a temperature of 25° C., and a moisture of 50%. The results are shown in Table 26. The larger the value is, the higher the volume specific resistivity of the rubber composition.

Rolling Resistance

The pneumatic tires produced as described above were mounted to regular rims, and then a regular inner pressure of 200 kPa was charged. Rolling resistance was measured by using a rolling resistance tester manufactured by STL at a speed of 80 km/h and a load of 4.7 kN. Rolling resistance of Comparative Example 12 was set to 100 by using a rolling resistance coefficient (RRC) obtained by dividing the detected rolling resistance by the load, rolling resistance of each of Example 8 and Comparative Examples 12 to 17 is indicated as a relative value. The smaller the value, the smaller the rolling resistance and better the performance. The results are shown in Table 27.

Tire Electroconductivity

The pneumatic tires produced as described above were mounted to regular rims, and then a regular inner pressure of 200 kPa was charged. Each of the tread parts was brought into contact with an iron plate at a load of 4.7 kN to measure an electrical resistance value between the tire rim part and the iron plate at an applied voltage of 100 V. The results are shown in Table 2.

TABLE 27

| | | Example 8 | Comparative Example 12 | Comparative Example 13 | Comparative Example 14 | Comparative Example 15 | Comparative Example 16 | Comparative Example 17 |
|---|---|---|---|---|---|---|---|---|
| Type of Blending | Tread Rubber | D3 | D3 | D3 | D3 | D3 | D3 | D3 |
| | Sidewall Rubber | E3 | E3 | E3 | E3 | F3 | F3 | E3 |
| | Breaker Rubber | G3 | G3 | G3 | G3 | G3 | H3 | G3 |
| | Entire Area Electroconductive Rubber | A3 | B3 | C3 | — | — | — | A3 |
| | Conduction Rubber | A3 | B3 | C3 | — | — | — | A3 |
| | Clinch Rubber | I3 | I3 | I3 | I3 | I3 | I3 | J3 |
| Tire Structure | | FIG. 3 | FIG. 3 | FIG. 3 | FIG. 4 | FIG. 4 | FIG. 4 | FIG. 3 |
| Tire Rolling Resistance | | 100 | 100 | 100 | 100 | 104 | 105 | 100 |
| Tire Electroconductivity (Electrical resistivity) | | $6.1 \times 10^6$ | $10^8$ or more | $10^8$ or more | $10^8$ or more | $10^8$ or more | $5.6 \times 10^6$ | $10^8$ or more |
| Ratio of Materials Derived from Stocks other than Petroleum | | 80% or more | 80% or more | 80% or more | 80% or more | 75% or less | 75% or less | 80% or more |

Referring to Table 27, Comparative Examples 12 and 13 do not realize improvement in tire electroconductivity since the rubber composition that is not sufficiently reduced in volume specific resistivity is used as the entire area electroconductive rubber. Also, in the case where the rubber composition sufficiently reduced in volume specific resistivity is used for the electroconductive rubber as in Comparative Example 17, tire electroconductivity becomes insufficient when electroconductivity of the clinch rubber is inferior. Comparative Example 13 to 16 are based on the conventional tire structure (of which schematic sectional view is shown in FIG. 4), and Comparative Example 14 is inferior in electroconductivity, while rolling resistance of Examples 15 and 16 are insufficient.

In contrast, Example 8 highly achieved both of improvements in rolling resistance and tire electroconductivity since the entire area electroconductive rubber composition having a volume specific resistivity of $6.1 \times 10^6$ Ω·cm was formed, and the volume specific resistivity of the tread part, the breaker, and the sidewall part was set to $1 \times 10^8$ Ω·cm or more, from which it is apparent that the pneumatic tires according to the present invention are excellent in both of rolling resistance and electroconductivity.

The pneumatic tire of the present invention capable of suppressing the rolling resistance and effectively discharging static electricity generated in tire during tire rubbing is suitably used for vehicles such as cars, tracks, buses, and heavy machineries.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A pneumatic tire comprising a tread part, a sidewall part, a bead part, a carcass extending from said tread part to said bead part through said sidewall part, and a breaker part disposed at an outside of said carcass in a tire radial direction, wherein
    each of tread rubber, breaker rubber, and sidewall rubber formed on said tread part, said breaker part, and said sidewall part, respectively, has a volume specific resistivity of $1 \times 10^8$ Ω·cm or more,
    said pneumatic tire further comprising
        a bead part rubber contacting a lower end of said carcass and disposed at a region contacting a rim flange of the bead part,
        a shoulder part electroconductive rubber layer disposed at a lower region of both edges of said breaker, between the carcass ply and an edge portion of the breaker part and an outer end of the sidewall part, said shoulder part electroconductive rubber layer having a radially inner end that is positioned radially outward of a height which correlates with a maximum section width of the tire, said electroconductive rubber layer not extending to the bead part rubber,
        a coating rubber coating an upper part of said breaker so as to have a region of at least 5 mm for contact with said shoulder part electroconductive rubber layer and so as to have a thickness of 0.2 mm or more and 3.0 mm or less, and
        a conduction rubber contacting the coating rubber and embedded in said tread part so as to be extended to the tire circumferential direction and so as to be at least partially exposed to a surface of a tread, the width W of said conduction rubber in a tire width direction being in a range from 0.2 mm to 10 mm,
    wherein each of ply rubber forming said carcass, said shoulder part electroconductive rubber layer, said coating rubber, said conduction rubber, and said bead part rubber has a volume specific resistivity of less than $1 \times 10^8$ Ω·cm, and
    wherein one bead part is electrically connected with the other bead part through each ply of rubber forming said carcass, said shoulder part electroconductive rubber layers, said coating rubber, and said bead part rubbers.

2. The pneumatic tire according to claim 1, wherein at least one of said ply rubber forming the carcass, said shoulder part electroconductive rubber layer, said coating rubber, said conduction rubber, and said bead part rubber contains metal foil or electroconductive carbon black.

3. The pneumatic tire according to claim 1, wherein said ply rubber, said shoulder part electroconductive rubber layer, said coating rubber, said conduction rubber, and said bead part rubber contain carbon black having a nitrogen adsorption specific surface area of 100 m$^2$/g or more in an amount of 30 to 100 parts by mass with respect to 100 parts by mass of a rubber component.

4. The pneumatic tire according to claim 3, wherein said ply rubber forming said carcass, said shoulder part electroconductive rubber layer, said coating rubber, said conduction rubber, and said bead part rubber contain metal foil in an amount of 1 to 10 parts by mass with respect to 100 parts by mass of a rubber component.

* * * * *